US011867529B2

(12) United States Patent
Jensen

(10) Patent No.: US 11,867,529 B2
(45) Date of Patent: Jan. 9, 2024

(54) ALTITUDE INITIALIZATION AND MONITORING SYSTEM AND METHOD FOR REMOTE IDENTIFICATION SYSTEMS (REMOTE ID) MONITORING AND TRACKING UNMANNED AIRCRAFT SYSTEMS (UAS) IN THE NATIONAL AIRSPACE SYSTEM (NAS)

(71) Applicant: RUMFERT, LLC, Omaha, NE (US)

(72) Inventor: David Dale Jensen, Omaha, NE (US)

(73) Assignee: RUMFERT, LLC, Omaha, NE (US)

( * ) Notice: Subject to any disclaimer, the term of this patent is extended or adjusted under 35 U.S.C. 154(b) by 665 days.

(21) Appl. No.: 16/983,633

(22) Filed: Aug. 3, 2020

(65) Prior Publication Data

US 2020/0363199 A1    Nov. 19, 2020

Related U.S. Application Data

(63) and a continuation-in-part of application No. 15/995,314, filed on Jun. 1, 2018, now Pat. No. 10,736,154.

(60) Provisional application No. 62/990,660, filed on Mar. 17, 2020.

(51) Int. Cl.
*G01C 5/06* (2006.01)
*G01S 19/47* (2010.01)
*B64C 39/02* (2023.01)

(52) U.S. Cl.
CPC .............. *G01C 5/06* (2013.01); *B64C 39/024* (2013.01); *G01S 19/47* (2013.01)

(58) Field of Classification Search
CPC .......... G05D 1/0011; G01S 19/47; G01C 5/06
See application file for complete search history.

(56) References Cited

U.S. PATENT DOCUMENTS

| | | |
|---|---|---|
| 8,903,568 B1 | 12/2014 | Wang et al. |
| 8,924,069 B1 | 12/2014 | Kaneshige et al. |
| 9,008,869 B2 | 4/2015 | Allen et al. |
| 9,028,312 B1 | 5/2015 | Wei et al. |
| 9,545,995 B1 | 1/2017 | Chau et al. |
| 9,588,516 B1 | 3/2017 | Gurel et al. |
| 9,650,155 B2 | 5/2017 | Wang et al. |
| 9,652,904 B2 | 5/2017 | Shi et al. |
| 9,663,227 B1 | 5/2017 | Lema et al. |
| 9,696,725 B2 | 7/2017 | Wang |

(Continued)

OTHER PUBLICATIONS

Unpublished U.S. Appl. No. 15/905,340, "Direct-Broadcast Remote Identification (RID) Device for Unmanned Aircraft Systems (UAS)"; applicant: Uavionix Corporation; filed Feb. 26, 2018.

(Continued)

*Primary Examiner* — Nicholas Kiswanto
*Assistant Examiner* — Christopher A Buksa

(57) ABSTRACT

The invention discloses an altitude initialization and monitoring system (AIMS) for unmanned aircraft systems (UAS). The altitude initialization and monitoring system is adapted to function as part of an airborne wireless sensing system (AWSS) associated with a UAS, transmitting flight data in support of remote identification (Remote ID) for UAS operating in the National Airspace System (NAS). The invention relates to a system, method, and software code executing the altitude initialization and monitoring functions. The invention may be implemented solely using a primary altitude sensor or may be implemented with one or more secondary (monitor) sensors.

20 Claims, 20 Drawing Sheets

(56) References Cited

U.S. PATENT DOCUMENTS

| | | |
|---|---|---|
| 10,114,756 B2 | 10/2018 | Koob et al. |
| 10,401,166 B2 | 9/2019 | Jensen |
| 10,736,154 B2 | 8/2020 | Jensen et al. |
| 2006/0138277 A1 | 6/2006 | Franceschini et al. |
| 2007/0244608 A1 | 10/2007 | Rath et al. |
| 2014/0297067 A1 | 10/2014 | Malay |
| 2014/0316616 A1 | 10/2014 | Kugelmass |
| 2015/0379874 A1 | 12/2015 | Ubhi et al. |
| 2016/0117853 A1 | 4/2016 | Zhong et al. |
| 2016/0214715 A1 | 7/2016 | Meffert |
| 2016/0363447 A1 | 12/2016 | Hayes |
| 2017/0127245 A1 | 5/2017 | Adkins |
| 2017/0285627 A1 | 10/2017 | Feldmann et al. |
| 2018/0046062 A1 | 2/2018 | Fisher et al. |
| 2018/0046187 A1 | 2/2018 | Martirosyan et al. |
| 2018/0120829 A1 | 5/2018 | Price |
| 2018/0162527 A1 | 6/2018 | Hupp et al. |
| 2018/0173247 A1 | 6/2018 | Ratti et al. |
| 2018/0218214 A1 | 8/2018 | Pestun et al. |
| 2018/0225230 A1 | 8/2018 | Litichever et al. |
| 2018/0260626 A1 | 9/2018 | Pestun et al. |
| 2018/0275654 A1 | 9/2018 | Merz et al. |
| 2019/0172357 A1 | 6/2019 | Meuleman et al. |
| 2019/0204824 A1 | 7/2019 | Micros |

OTHER PUBLICATIONS

Eagle Tree Systems, LLC—Altimeter MicroSensor V4 Company product web site: http://www.eagletreesystems.com/index.php?route=product/product&path=64&product_id=60 Product manual: http://www.eagletreesystems.com/Manuals/altimeter-v4.pdf.

Parrot—Navigation board https://www.dollarhobbyz.com/products/parrot-ar-drone-2-0-quadcopter-navigation-board?variant=10907414401&gclid=COO7s_e2mNMCFdK6wAodZ0QKVw.

Hobby King Altimeter Bluetooth Adapter Company web site: https://hobbyking.com/en_us/hobbykingr-tm-altimeter-bluetooth-adapter-for-wireless-android-app.html?__store=en_us Manual site: https://hobbyking.com/media/file/720875413X365809X2.pdf.

Jolly Logic products—Altimeter one, Altimeter two, Altimeter three Company site: https://www.jollylogic.com/ Altimeter One site: https://www.jollylogic.com/products/altimeterone/ Altimeter Two site: https://www.jollylogic.com/products/altimetertwo/ Altimeter Three site: https://www.jollylogic.com/products/altimeterthree/.

Leddar Tech product—Leddar One (optical IR sensor) Company site: http://leddartech.com/ Product site: http://leddartech.com/modules/leddarone/.

Estes—Model Rocket Altimeter Company site:http://www.estesrockets.com/ Product site: http://www.estesrockets.com/rockets/accessories/002246-estesr-altimeter.

Hobbyist altimeter: http://hackaday.com/2014/06/20/the-ultimate-tiny-altimeter/?utm_source=feedburner&utm_medium=feed&utm_campaign=Feed%3A+hackaday%2FLgoM+%28Hack+a+Day%29.

DJI—Drones with integrated navigation boards & altimeter function Company site: http://www.dji.com/ Product manual: https://dl.djicdn.com/downloads/phantom_4/20170327/Phantom+4+User+Manual+v1.4.pdf.

Public Missiles Ltd Co-pilot V3 Altimeter Web site: https://publicmissiles.com/product/electronics Manual: https://publicmissiles.com/secure/images/CoPilot3InstructionsVer1_3.pdf.

PerfectFlite altimeters: http://www.perfectflite.com/Firefly.html FireFly: http://www.perfectflite.com/Firefly.html StratoLoggerCF: http://www.perfectflite.com/SLCF.html StratoLogger SL100: http://www.perfectflite.com/s/100.html Pnut: http://www.perfectflite.com/pnut.html.

Marsa Systems Marsa54 http://www.marsasystems.com/index.php/products/marsa54lhd.

Missile Works RRC3 http://www.missileworks.com/rrc3/ User manual http://www.missileworks.com/app/download/965482691/RRC3+User+Manual+v1.60.pdf.

Eagle Tree Systems, LLC Seagull Wireless Dashboard Flight System Web site: http://www.eagletreesystems.com/index.php?route=product/product&path=63_70&product_id=90 Manual: http://www.eagletreesystems.com/Manuals/Pro,%20Glide,%20Flight%20and%20Boat%20Seagull%20and%20Data%20Recorder%20Instruction%20Manual.pdf.

Bluetooth Open Altimeter—Web site: http://www.bluetoothopenaltimeter.com/.

Bluetooth Open Altimeter—User's Guide.

Open Altimeter—Website (Home page) http://openaltimeter.org/index.html.

Open Altimeter—Website (Hardware page) http://openaltimeter.org/hardware.html.

Open Altimeter—Website (Instructions page) http://openaltimeter.org/instructions.html.

Spektrum SPMA9575 Aircraft Telemetry Altimeter—Web page https://www.spektrumrc.com/Products/Default.aspx?ProdID=SPMA9575.

Spektrum AR9320T Telemetry RX—Web page https://www.spektrumrc.com/Products/Default.aspx?ProdID=SPMAR9320T.

Spektrum SPMA9589 Aircraft Telemetry Variometer Sensor—Web page https://www.spektrumrc.com/Products/Default.aspx?ProdID=SPMA9589.

Uavionix Corporation, Concepts for Remote Identification, Mar. 22, 2017, p. 11, sctn 5.7 Airborne Component; https://uavionix.com/downloads/whitepapers/uavionix-remote-identification-white-paper.pdf.

AlliedSignal Electronic & Avionics System; Description of Geometric Altitude for the Egpws; Mar. 16, 1999; https://www.theairlinepilots_com/forumarchive/concepts-procedures/geometric-altitude.pdf.

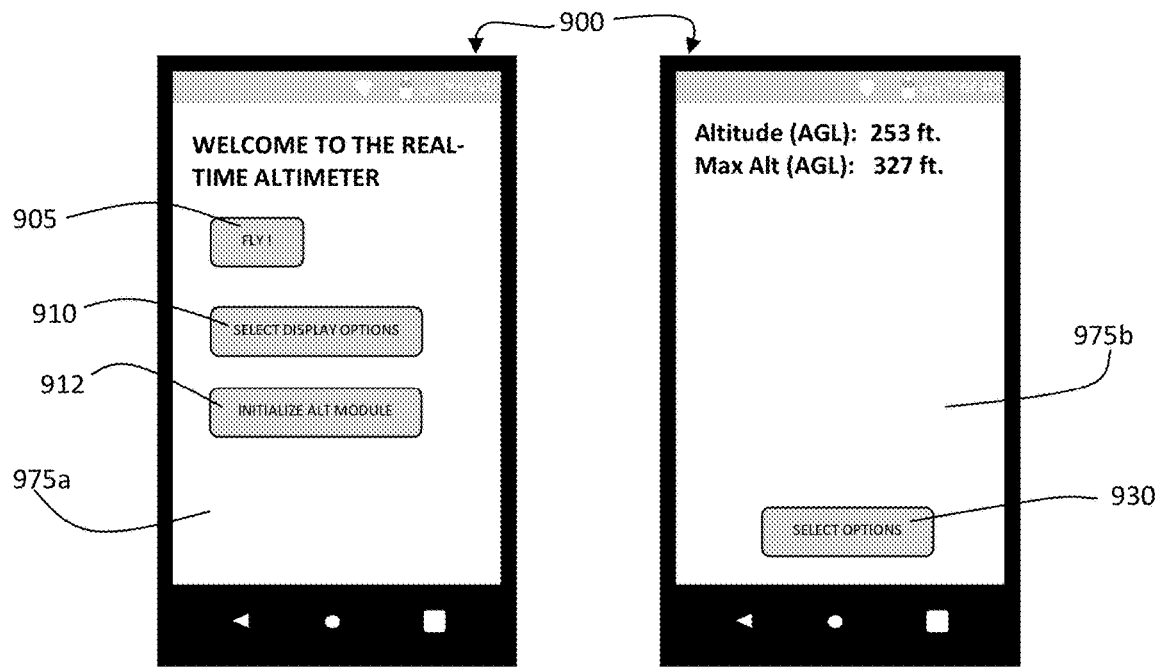
Figure 9a
Figure 9b
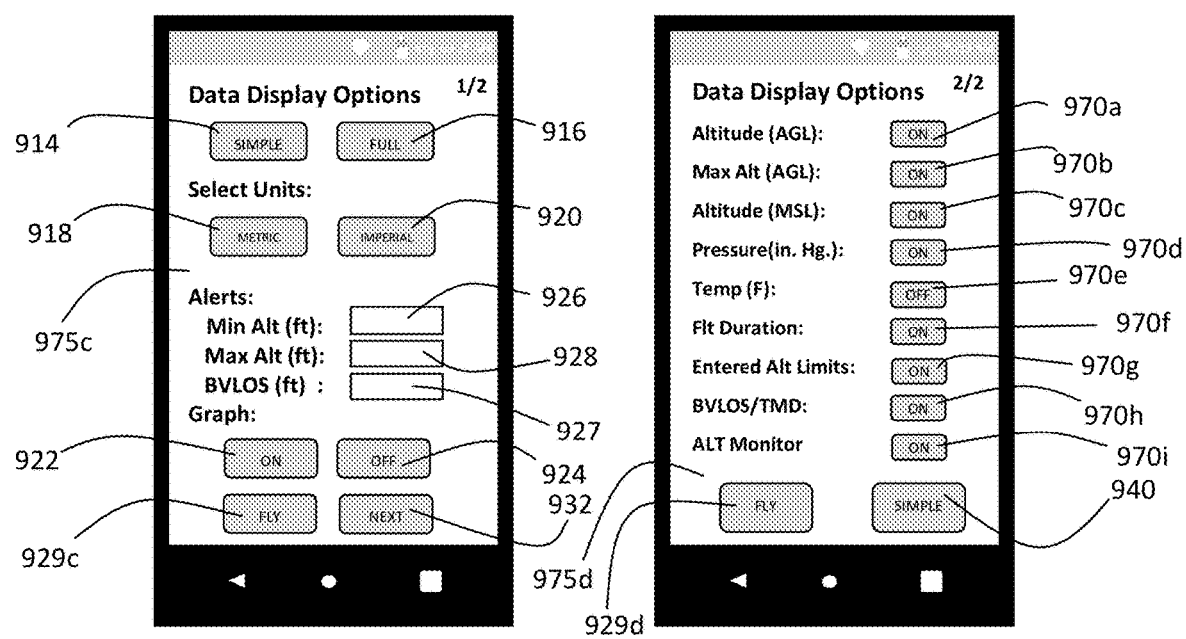
Figure 9c
Figure 9d

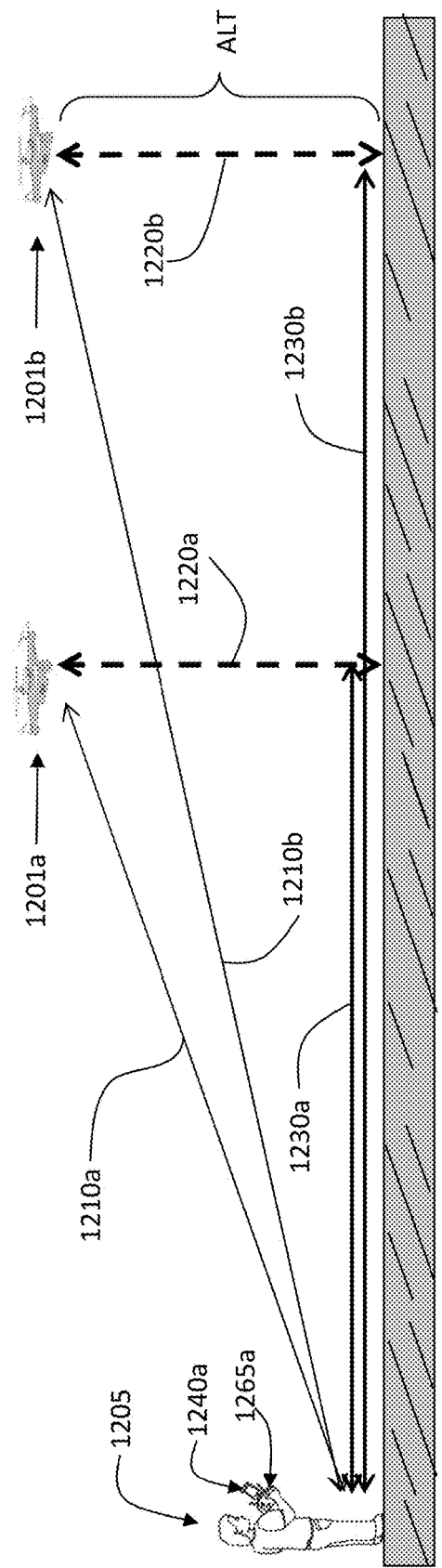
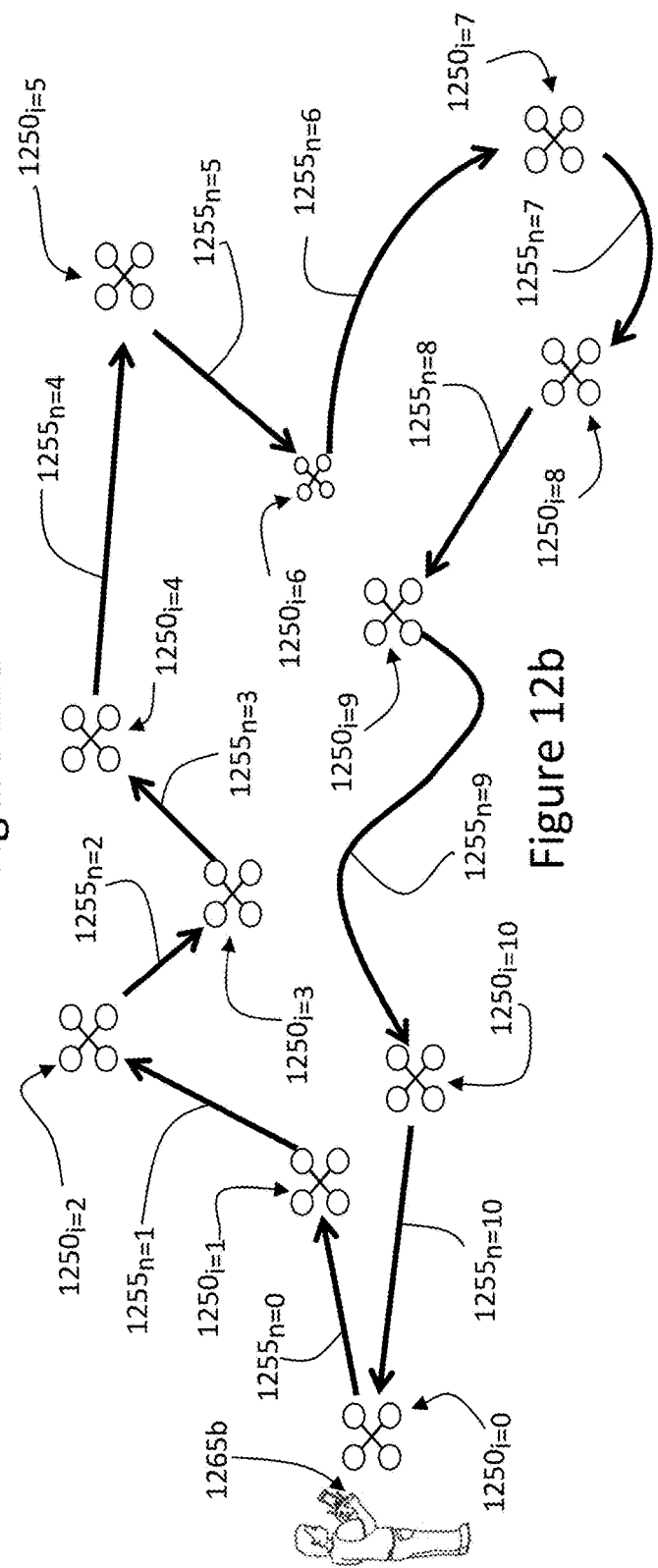

ALTITUDE INITIALIZATION AND MONITORING SYSTEM AND METHOD FOR REMOTE IDENTIFICATION SYSTEMS (REMOTE ID) MONITORING AND TRACKING UNMANNED AIRCRAFT SYSTEMS (UAS) IN THE NATIONAL AIRSPACE SYSTEM (NAS)

CROSS REFERENCE TO RELATED APPLICATIONS

This application is a continuation-in-part of U.S. patent application Ser. No. 15/995,314 filed Jun. 1, 2018, which is a continuation-in-part of U.S. patent application Ser. No. 15/622,028 filed Jun. 13, 2017 (now U.S. Pat. No. 10,401,166), both of which are incorporated herein by reference in their entirety. This application also claims benefit of provisional application Ser. No. 62/990,660 filed Mar. 17, 2020, which is herein incorporated by reference.

TECHNICAL FIELD

The subject matter of the invention relates generally to Unmanned Aircraft Systems (UAS) and more particularly to the determination and remote real-time display of UAS flight data for UAV/UASs using wireless data-link techniques. More specifically, it relates to a system and method for implementing an altitude initialization and monitoring system (AIMS) used to initialize the altitude system and verify changes in UAS altitude indicated by a primary source.

BACKGROUND OF THE INVENTION

Unmanned Aircraft Systems (UAS) have been around for many years. Advances in technology and reductions in size and cost have resulted in an escalation in recreational use and have begun to spur their exploitation for commercial purposes. However, restrictions, particularly the limitation on beyond line of sight (BVLOS) operations, have hampered commercial operations. This is beginning to change. The Federal Aviation Administration has begun promulgating rules for both recreational and commercial users. The ultimate regulatory goal is achieving an acceptable balance between public safety and maximum utilization for both commercial and recreational uses. The 'remote identification' function plays a significant part in the implementation of these new regulations.

Remote Identification is the name given to a function whereby certain data associated with a UAS operation is made available to interested parties such as law enforcement, air traffic control, other operators, and even the general public. UAS remote identification data can be broken into two parts; the identification data and the navigation/guidance data. The identification data may consist of items such as UAS registration, pilot ID, mission identifiers, or the like. Navigation/guidance data may consist of items such as position (Latitude/Longitude), altitude, speed, heading/course, or the like. The present invention is directed primarily to the navigation data component. Specifically, altitude, which plays a significant safety role in UAS operations, especially for BVLOS operations. For various reasons, including most significantly compatibility with manned aircraft operations, barometric (i.e. pressure) altitude is favored over geometric (GPS) altitude.

Current regulations for small UAS (sUAS), i.e. those under 50 lbs weight, are that the UAS must remain within visual line of sight (WVLOS) and fly at altitudes less than 400 feet above ground level (AGL). There are also regulations about what types of airspace may be used and hours of the day operations may be conducted. The FAA has a waiver program where operators may apply to have some of these restrictions temporarily waived under strict circumstances. The remote ID operational regulations will go a long way to liberalizing UAS operations and making commercial utilization more viable.

At the heart of the remote ID concept is the idea that certain navigational and identifying parameters would be broadcast in real-time and made available to a user needing this data. Such users might be air traffic controllers for traffic deconfliction, law enforcement for public safety, pilot/operators for operational situational awareness, and even the public to allay fears of invasion of privacy or other concerns real or imagined.

A system of one or more sensors may be affixed, secured or otherwise associated with the UAS for sensing, processing, or otherwise obtaining the required navigational data required for the remote ID function. Computer program instructions may be used by processing hardware associated with these systems to execute and manage these functions including, specifically, acquisition of UAS flight data by the sensors, processing the data, transmitting the data to ground or air based receivers, and generating any pertinent alerts. Navigation data, specifically altitude, is a particular focus of the invention.

One common method of sensing altitude is the barometric pressure sensor, referred to as a pressure altimeter. The pressure altimeter has been used throughout aviation history as the primary source of altitude due to the well known deterministic relationship between pressure and altitude. This also introduces some variability in altitude measurements since atmospheric pressure is in a near constant state of change due to natural meteorological conditions. This is true even for geographically fixed positions, but the variability is exacerbated when position is constantly changing, such as during an aircraft flight. Furthermore, this variability is most important during operations near the ground such as takeoff and landing. Manned aircraft accommodate this meteorological variability by resetting their pressure altimeters to the local 'altimeter setting' on the ground prior to takeoff and in the air as they enter the terminal area for landing. UAS, on the other hand, which spend nearly all their flight time relatively near the ground, have no one to manually reset the altimeter; any 'resetting' must be done remotely. The present invention teaches a system and method for monitoring UAS altitude and alerting the pilot to significant pressure altitude drift, particularly meteorologically induced drift. The invention also teaches a system and method for initializing the UAS altitude monitoring system prior to flight to accommodate current local meteorological conditions and for re-initializing the system, should the monitoring system so indicate.

SUMMARY OF THE INVENTION

The invention provides an airborne wireless sensor system (AWSS) which may be removably attached to a UAV/UAS for transmitting UAS flight data to end users and more specifically for sensing and monitoring UAS altitude during flight. The invention provides a system and method of pre-flight initialization of an altitude monitoring system associated with the AWSS, and with a system and method of reinitializing the monitoring system should monitoring during flight indicate a need. In an exemplary embodiment, the AWSS communicates with a remote receiver/display device (RRDD) to achieve the invention objectives.

In the exemplary embodiment, the Airborne Wireless Sensor System (AWSS) comprises one or more sensor modules for acquiring various flight data such as altitude, position, environmental data, or the like, associated with the UAS. The airborne sensing system also comprises a non-volatile memory (NVM) for storing the altitude initialization parameters and AWSS computer instruction code set, a processor module coupled to the NVM and operative to execute the AWSS computer instruction code set and coupled to the sensor module(s) and operative to receive and process the data sensed by the sensor module(s). The AWSS computer instruction code set may be referred to as the 'flight code' to identify it as the code associated with the airborne system. In an exemplary embodiment, the flight code is loaded into the AWSS processor memory in the factory prior to shipment. The airborne sensing system further comprises a wireless communication module coupled to the processor module for transmitting sensed UAS flight data to a remote receiver/display device (RRDD) over a wireless network. The system may also include a user input device.

In exemplary embodiments one or more wireless networks may be used to communicate data to and from the AWSS, including the altitude initialization parameters. The wireless network may utilize the Wi-Fi, Bluetooth, Zigbee, ISM protocols, V/UHF, cellular/internet, satellite data networks, or the like. One or more networks may be in use at a time, and one network may be used for the altitude initialization process while another is used for the conveying UAS flight data.

The monitoring system utilizes a primary altitude sensor and may include one or more secondary (monitor) sensing systems, the one or more secondary (monitor) sensing systems being independent of the source of variability for the primary altitude sensing system. It should be noted that secondary (monitor) sources are merely aids in the monitoring function, and the monitor function may be executed by the pilot solely monitoring the primary altitude source. Monitoring may simply involve the pilot looking at the UAS altitude reported by the primary sensor or may be assisted by the one or more secondary (monitor) systems.

In one exemplary embodiment, the primary altitude sensor is a barometric pressure sensor measuring pressure altitude, and the secondary (monitor) source is an Inertial Measurement Unit (IMU)/Accelerometer measuring accelerations in the vertical (z-axis). In another embodiment, the secondary (monitor) comprises both an accelerometer and a GPS which measures geometric altitude based on trilateration with the GPS satellites. The invention includes a method for displaying various sensed UAV/UAS flight data, including altitude and related monitor data and alerts, on remote receiver/display devices (RRDD) such as a desktop and laptop computers, portable smart devices, and the like.

The monitor sources may highlight altitude changes which occur in the primary source which are not also reflected in the monitor source, implying that such change is due to meteorological or factors other than a change in vehicle height. For example, changes in pressure altitude which are not accompanied by a vertical acceleration might be implied to be due to meteorological conditions. Similarly, system related 'glitches' may occur, corrupting the pre-flight initialization. Such a situation may then be used to trigger an alert to the pilot either for situational awareness and or to take corrective action. Such corrective action might be a manual resetting or recalibration of the pressure sensor such as landing and re-initializing the system. Note that in some embodiments, re-initialization of the AWSS, including a resetting or recalibration of the pressure altitude sensor data, may be restricted to situations where the UAS is on the ground. Determination of whether the UAS is on the ground or in the air may be made by a weight-on-wheels (WOW) module. In this specification, where weight-on-wheels is used, it is intended to cover both a 'hard' physical WOW switch and a 'soft' virtual switch where the switch state is inferred based on some criteria such as altitude, e.g. if AGL altitude <10 feet=>WOW=GROUND.

The pre-flight initialization and intra-flight re-initialization may consist of initializing certain altitude initialization parameters while the UAS is on or near the ground. The process may involve the pilot/operator entering one or more optional data items to affect the initialization. For example, the pilot may enter the mean sea level elevation of the take-off point, referred to in the specification as the take-off elevation (TOE). This provides the system with a reference point which may be used to correct the raw sensed pressure altitude for the local meteorological conditions. This raw sensor pressure, corrected for local meteorological conditions, will be referred to throughout this specification as the corrected pressure altitude. Additionally, since many of the FAA rules and regulations are framed in terms of altitude above ground level (AGL), the initialization process may include determination of a zero_AGL_bias. As explained in detail in U.S. Pat. No. 10,401,166 and U.S. patent application Ser. No. 15/995,314, this bias determination utilizes the MSL pressure altitude sensed on the ground to determine an offset to be applied to in-air pressure altitude readings to return an AGL altitude in addition to the sensed MSL altitude. In addition, the system may perform certain statistical determinations during an 'alignment' phase while the UAS is on the ground. During this 'alignment,' the altitude monitoring system may monitor the primary and secondary sources and compile statistical data such as mean, standard deviations, and correlation statistics, e.g. mean GPS altitude standard deviation ($\sigma_{GPSaltbar}$) or instantaneous GPS altitude standard deviation ($\sigma_{GPSalt}$), which may be displayed to the pilot to indicate the state of the 'alignment.' This data may be of interest in determining when to commence flight.

A wireless remote receiver/display device (RRDD) may be used for receiving and displaying the transmitted UAV/UAS flight data and associated alerts in real-time. The RRDD may also be used for providing an input means for the pilot to enter the altitude initialization data. In one exemplary embodiment, the RRDD is a smart device. The receiver/display may comprise a non-volatile memory for storing computer instructions or code (aka 'app code' or an 'app'), a processor system for executing those instructions, a display for displaying information to the operator, an input means for receiving input from the pilot/operator, and a communications module operative to facilitate wireless communication between the remote receiver/display device (RRDD) and a wireless network. Examples of remote receiver/display devices (RRDD) include, but are not limited to, tablet computers, laptops, personal data assistants, smartphones, smartwatches, and the like.

The remote receiver/display device's (RRDD) computer software instruction set (aka 'app code') may be stored in the RRDD non-volatile memory and executable by the RRDD processor to receive pilot altitude initialization inputs and facilitate the reception and display the transmitted UAS flight data. The software instruction set might also control wireless communication.

In an exemplary operational scenario, the AWSS is removably attached to the UAS, and the remote receiver/display device (RRDD) is located on or near the pilot flying the UAS such that the remote receiver/display device (RRDD) is in visual proximity to the pilot. The airborne system and remote receiver/display device (RRDD) are independently switched on and/or activated prior to flight. The airborne system and remote receiver/display device (RRDD) software code sets may have initialization sequences that run automatically upon power-up. The initialization sequence of the remote receiver/display device (RRDD) code set may include display of GUI/pages, allowing the pilot to make various selections and enter data, receiving operator input of altitude and other initialization parameters, selection of data display formats, connection to the wireless network, and communication of the initialization parameters to the AWSS. Altitude initialization and alerting parameters might include take-off elevation (TOE), offset height (OFF_H), altimeter setting (ALTM_SET), maximum altitude (MAX_ALT (AGL)), minimum altitude (MIN_ALT (AGL)), maximum delta altitude (MAX_$\Delta$_ALT), maximum mean pressure altitude standard deviation (MAX_PBAR_$\sigma$), maximum mean GPS altitude standard deviation (MAX_ZGPSBAR_$\sigma$), and maximum mean z axis standard deviation (MAX_VDOT_$\sigma$). Configuration/alerting parameters enterable by the pilot may include reset_inhibit_alt (RIA), BVLOS distance, zero_gps_pressure_drift (ZGPD), and max_gps_pressure_drift (MGPD). Operational variables initialized might include total distance traveled (TDT), flight duration (FLT_DUR), maximum mission altitude (MAX_MA), and control station/UAS distance (CS/UAS_DIST). Most of these parameters and variables have default values which could be used in place of operator entry. The initialization sequence of the AWSS code set may include an initialization altitude calibration, receiving altitude initialization parameters and operator configuration parameters and display formats from the remote receiver/display device (RRDD), and setting up wireless connections.

After initialization, the flight of the UAS may then commence whereupon altitude and/or other sensor data, including altitude monitor data and any alerts, is periodically transmitted from the AWSS to the remote receiver/display device (RRDD). Depending on wireless protocol, data may be transmitted in the blind (w/o specific request), or it may be delivered on demand such as when a client requests a page. Transmissions might be direct broadcast or networked. Upon receipt of the transmitted data, it, and any associated alerts, may be displayed on the remote receiver/display device (RRDD). The data display format may be one of a plurality of default formats or may be one of the operator selected data display formats.

The present invention is suited for employment as a stand-alone system removably mounted to a UAV and independent of the UAS electronics, integrated with the UAS OEM electronics as an aftermarket add-on, or with production UAS OEM electronics, or as a plug-in module for a larger navigation system.

BRIEF DESCRIPTION OF THE DRAWINGS

FIGS. 9a-9m illustrate some graphical user interface (GUI) screen shots as they might appear on a client device implementing the process of the present invention.

FIGS. 12a and 12b are illustrations of several distance parameters discussed in the specification.

DETAILED DESCRIPTION

Figure 1:
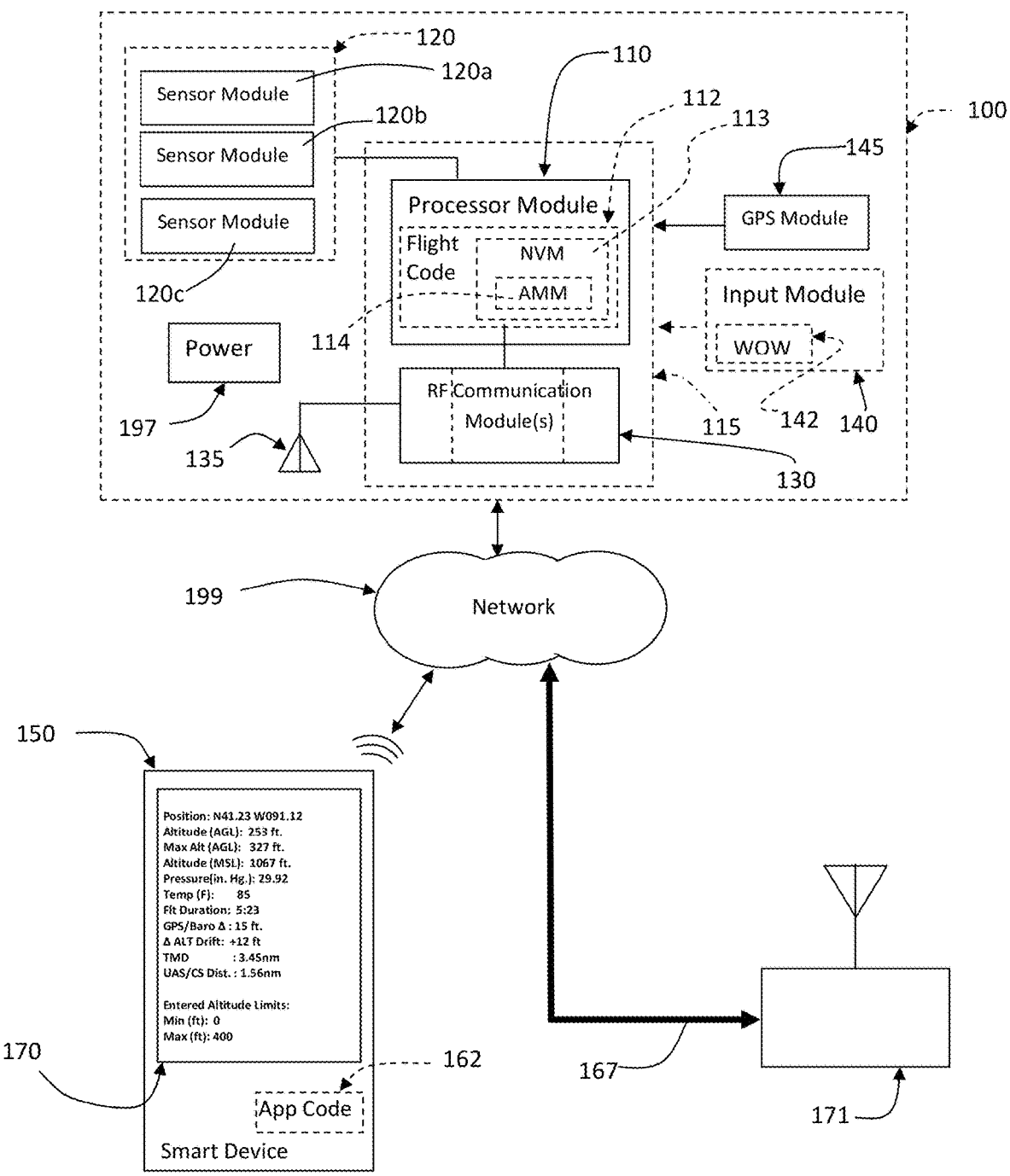
FIG. 1 is a block diagram illustrating major components of the system and method of the invention.

FIG. 1 illustrates, in block diagram form, an exemplary embodiment of the present invention. As seen generally, the invention comprises an Airborne Wireless Sensor System (AWSS) 100 wirelessly connected to one or more remote receiver/display devices (RRDD)/'smart' devices 150 through one or more wireless networks 199. As may be deduced from its name, the AWSS 100 is the portion of the system which flies with the UAV/UAS, whereas the smart device 150 remains on or near the ground and generally within visual range of the UAV/UAS pilot or another visual observer.

AWSS 100 generally represents the hardware, circuitry, and processing logic necessary to sense UAV/UAS altitude and/or other data, process the data and transmit the data to the RRDD/smart device 150 over wireless network 199. In a basic configuration, the AWSS 100 may comprise one or more sensor modules 120a, 120b, 120c for sensing flight data, one or more communications modules 130 for connecting to the one or more wireless networks 199, one or more processor modules 110 for processing the sensor data and controlling the communication networks, and a power module 197 for supplying power to the AWSS 100. An input module 140, including a weight on wheels (WOW) module 142, might also be provided in some embodiments. As seen by the dotted lines in the figure, one or more of the components may be combined into physically integrated components. For example, one or more sensor modules might be combined into a sensor suite 120, resulting in a sensor capable of sensing a plurality of data parameters. As another example, the processor 110 and communication module 130 may be combined into a single integrated component such as a System on a Chip (SoC). The AWSS 100 may also comprise non-volatile memory 113. The non-volatile memory 113 could be a discrete module in the AWSS, or it could be integrated into the processor module 110. The non-volatile 113 memory may store altitude and other initialization parameters, flight data, or the like. The memory 113 may also store computer code or instructions 112. These instructions would be executable by the processor 110, which, when executed, enable the AWSS to perform its intended functions. In one exemplary embodiment, the non-volatile memory 113 comprises the Altitude Monitoring Module (AMM) 114 which performs much of the processing associated with the altitude initialization and monitoring system (AIMS) function described by the present invention.

In an exemplary embodiment, the AWSS 100 is designed to be a stand-alone device, i.e. not physically or electrically integrated with any of the UAV/UAS structures or components. It is designed to be removably attached to a UAV/UAS such that it is carried aloft when the UAV/UAS is launched but also able to be easily moved from one UAV/UAS to another.

One or more wireless networks 199 are the medium through which information is communicated by the AWSS 100 to/from the RRDD/smart device 150 and end users 171. Wireless networks 199 may be any one of a plethora of various network types such as LAN, WAN, PAN, VPN, ISM, Wi-Fi, Bluetooth, Zigbee, and cellular/internet, to name just a few. In one exemplary embodiment, during the pre-flight initialization process, the AWSS 100 functions as a wireless access point connecting to one or more client devices 150 thru a Wi-Fi network. In yet another embodiment, the AWSS may connect to a wireless router connected to the internet, and AWSS data may be sent to end users 171 via an internet broadband connection 167 (see FIG. 11c). In still a further embodiment, AWSS communication module 130 may comprise a cellular internet modem, allowing direct access to an internet connection. Many alternative combinations are possible.

In the pre-flight programming mode, RRDD/smart device 150 may be a ground based device maintained in visual proximity to the UAV/UAS pilot or other observer such that a close visual inspection of the UAV/UAS altitude and/or other data displayed thereon may be maintained. RRDD/smart device 150 may be realized as a commercial off-the-shelf device having a communication module for receiving a wireless data signal transmitted by the AWSS 100, a processor, and a display means 170 for displaying the received data to the user and also for receiving operator input, such as a touch screen display. Some examples of such off-the-shelf RRDD/smart devices, by no means exhaustive, are laptops, tablet computers, PDAs, smartphones, and smartwatches. While in an exemplary embodiment the RRDD/smart device 150 may be represented by such products as smartphones, laptop computers, tablet computers, personal data assistants and others, it is also envisioned that the smart device 150 could be a specially manufactured device specifically for the purpose of interfacing with the AWSS 100. It is also envisioned that the smart device 150 would have a non-volatile memory into which software code or instructions ('app code') 162 could be loaded for execution by the smart device processor. Execution of the code 162 by the smart device processor would enable performance of the smart device functions enumerated throughout this disclosure. It is envisioned that the collection and transmission of the UAV/UAS flight data by the AWSS 100 and the reception and display of the flight data on the smart device 150 and/or end user computer 171 occurs in real-time.

The RRDD/smart device application or software instruction code ('app code') may produce the Graphical User Interfaces (GUIs) illustrated in FIGS. 9a-g for displaying data and receiving pilot inputs. As described in more detail below, the GUI pages provide a means for the pilot to enter the altitude initialization parameters used to correct and monitor the sensed raw pressure altitude. As described in some detail below, instructions/code 162 may, among other things, control the smart device initialization sequence, wireless connectivity, UAS data reception, processing, and display. In general, the app code allows the device 150 to connect wirelessly to the AWSS 100, receive operator input, transmit the operator input to the AWSS 100 over the wireless network 199, receive pre-flight and flight data from the AWSS 100 over the wireless network 199, and display the received data. End user device 171 may similarly have application code or instructions for accessing and displaying UAS flight data.

The sensor module(s) 120 represent the hardware, circuitry and processing necessary to measure UAV/UAS altitude and/or other data and interface with other system components. Choice of sensor depends, of course, on what data is being measured or acquired. For example, for measuring altitude, sensors including, but not limited to, acoustic sensors, RADAR sensors, LIDAR sensors, GPS, and barometric pressure sensors. Some are direct measures of altitude, while others indirectly measure altitude. Additionally, some sensors do not measure altitude but may be used in an altitude monitoring role such as an inertial measurement unit (IMU) or accelerometers. Some are more accurate than others, and some would be far too heavy and expensive for the intended application.

In an exemplary embodiment, the sensor module 120 includes primary and secondary (monitor) sensors. In an exemplary embodiment, the primary altitude sensor is a barometric pressure sensor implemented for measuring UAV/UAS pressure altitude. There are many commercial off-the shelf (COTS) pressure altimeters and pressure sensors on the market. Some specific manufacturers of pressure sensors are Bosch (BMP series), TE Connectivity (MS560702 series), NXP USA (MPL series), Amphenol (NPP-301 series), Honeywell (NBPLPNN series), STMicroelectronics (LPS series), and EPCOS (TDK) (B58600 series) to name but a few.

In an exemplary embodiment, a Global Positioning System (GPS) may function as a secondary (monitor) source. Some GPS module manufacturers are u-blox, Sierra Wireless, and Broadcom to name just a few. There are also manufactures which integrate a GPS receiver and a microcontroller such as Qualcomm and STMicroelectronics. As discussed below, it is understood that the accuracy of GPS altitude is insufficient to be used as a stand-alone primary source of altitude; however, its functionality may be sufficient to utilize it as a monitor of the pressure altitude.

In another exemplary embodiment, the secondary (monitor) system may be an Inertial Measurement Unit (IMU) used to measure accelerations, specifically the vertical acceleration, to validate changes in altitude. While an IMU does not measure altitude, it can be used to verify or refute that changes in pressure altitude are, in fact, due to a change in altitude and not atmospheric pressure. In still another exemplary embodiment, the barometric sensor, the GPS, and the IMU are all used as primary, secondary, and tertiary sources in an altitude monitoring system.

While the above discussion has focused on the measurement of UAV/UAS altitude, other flight data may be determined using other sensors. For example, the GPS module 145 coupled to the processor module 110 used as the secondary (monitor) source for the altitude function may also be used as the primary source of position and speed.

Most of the sensors discussed here utilize a standard interface such as SPI, I2C, USB, RS232, and the like. The SPI and I2C interfaces, in particular, are very common on small microprocessor systems and are frequently used in System on a Chip (SoC) designs. Thus, most of these sensors are easy to integrate with a minimum of components. Additionally, many of the sensors described have a 'sleep mode' which allows them to be put into a power conserving mode. Regardless of which sensor(s) is used, it (they) would be coupled to the processor module 110 for any necessary processing and to provide the sensed/processed data to the communication module 130 to be made available on the wireless network 199.

The wireless communications module 130 represents the hardware, circuitry, and processing necessary to receive commands and to receive and transmit data on the wireless network 199. It receives command instructions and the flight data from the processor module 110 and effectuates the transmitting of the data from the AWSS 100 onto the wireless network 199. Wireless communication module 130 may also comprise the necessary circuitry and functionality to receive requests from the network 199 and convey the requests to processor module 110.

Within the RF class, there are many families or standards of wireless communication. For example, Wi-Fi, Bluetooth, Zigbee, cellular, ISM, WPAN, satellite, etc represent just a few. Some wireless module manufacturers provide an integrated processor/communication function in a SoC configuration. It is a popular development space, especially in the area of integrated Wi-Fi and Bluetooth modules. Utilization of a SoC design is an extremely attractive option as it reduces part count and physical footprint. Additionally, many times the integrated component may have achieved FCC certification. Communication modules 130 adapted to connect to wireless networks are sometimes referred to as 'wireless network interface controllers.' Many networks connect to the internet through a server or wireless router. However, others define a closed or local area network known as a 'wireless local area network' or WLAN for Wi-Fi based networks or 'wireless personal area network' or WPAN for Bluetooth based networks. In some of these local networks, devices may connect directly to each other without an intermediary device such as a server. These networks are sometimes referred to in the art as wireless 'ad-hoc' networks (WANET) or Wi-Fi direct networks. It is expected that more than one network may be used at one time. In one exemplary embodiment, the pre-flight programming wireless network 199 comprises a wireless WiFi ad-hoc network.

As mentioned, in one exemplary pre-flight programming embodiment, the AWSS 100 may be configured as a wireless access point (WAP) with the smart device 150 operating as a client. However, instead of the usual WAP which may provide wired access to a public network such as the internet, the AWSS 100 establishes its own private Wireless Local Area Network (WLAN). This is also sometimes referred to as an 'ad-hoc' network with peer to peer (P2P) communication. In this embodiment, and by principles well understood by those in the art, the AWSS 100 acts as a 'server,' serving up data and/or 'pages' to connected client devices upon request of the client who may then return data to the server. In other embodiments, cellular/internet is used for networked communications. Connection to the internet may be directly from the UAS or through a router (see FIG. 11c).

Regardless of the communication module realization, transmission will generally require an antenna. In FIG. 1, it is seen that the communication module 130 is connected to an antenna 135 for broadcast of the flight data to the smart device 150. In some embodiments, this is a simple ¼ wavelength wire which can be placed anywhere so as not to interfere with flight operations. Alternatively, and in an exemplary embodiment, the antenna may comprise traces on a printed circuit board (PCB). Several of the manufacturers of the SoC Wi-Fi modules referenced above provide PCB trace antennas as part of their design. Such antennas are generally suitable for the ranges involved but may be supplemented or replaced by external antennas, if needed. External antennas will generally be required for effective cellular and V/UHF communications.

In some embodiments, the AWSS 100 may also include an input interface module 140 coupled to processing module 110. The interface module 140 might be a means of setting configuration variables that could be read by the processing module 110 or other entry of data or selections. As mentioned above and described in more detail below, it is also contemplated that these and/or other selections may be made on the RRDD/smart device and transmitted wirelessly to the AWSS 100 for implementation. The input interface 140 may also comprise the weight-on-wheels (WOW) module 142 used to determine if the UAS is on the ground or in the air. Recall the WOW module may be a physical 'hard' switch or a virtual 'soft' switch. The input interface 140 may also comprise a power switch controlling application of electrical power to the unit 100.

The processor module 110 generally represents the hardware, circuitry and processing logic necessary to execute instructions, process data and interface with the other components of AWSS 100 such as the sensor modules 120, the communication modules 130, and input interface module 140. Processor module 110 may comprise non-volatile memory 113 for storing instructions 112. These instructions would be executable by the processor 110 and when executed, enable the AWSS 100 to perform its intended functions as described herein.

Processor module 110 may interface to sensor module 120 to provide initialization commands related to the sensor acquisition of data. The interface to the sensor may also operate to receive sensor data in a manner which may be prescribed by flight code 112 executing in processor module 110. Flight code 112 might be factory preloaded and/or field loadable or field modifiable, as is well understood in the art. Examples of sensor data scheduling may be periodic or on demand. Upon reception of sensor data, the processor module may perform certain processing of the data which again may be prescribed by the flight code 112. Examples of such processing might be a computation which results in a sensor value in one reference frame (e.g. MSL) being converted to another reference frame (e.g. AGL). Also the correction of raw sensed pressure altitude with the correction factor to compensate for local meteorological conditions may be processed by processor 110. Additionally, the altitude initialization programming process may be controlled by processor module 110. Coupling of the sensor module(s) 120 and processor module 110 may be by standard interfacing protocols such as I2C, SPI, serial, or the like. Specific choice will be driven by the components selected for the implementation.

Similarly, an interface may be provided between processor module 110 and communication module 130, wherein the processor module 110 may control initialization of the communication module 130 to perform tasks such as setting communication protocols, communication rates, and establishing the wireless network 199. The interface may also provide the means for the processor module 110 to convey initialization and flight data to and from the communication module 130. Coupling of the communication modules 130 and processor module 110 may be by standard interfacing protocols such as I2C, SPI, serial, or the like. Specific choice will be driven by the ICs selected for the implementation.

As will be appreciated by those skilled in the art, processor module 110 may be any of a number of devices capable of performing such functions, some examples being microprocessors, microcontrollers, Application Specific Integrated Circuits (ASIC), Programmable Logic Array (PLA), Field Programmable Gate Array (FPGA), Processor System on a Chip (PSoC) systems, etc. As is well understood in the art, processor module(s) 110 and communication module(s) 130, though drawn separately in the figure to highlight their functional responsibilities, may, in fact, be integrated into a single physical System on a Chip (SoC) 115. In an exemplary embodiment, the processor module is part of a System on a Chip (SoC) implementation which integrates both the processing function and the wireless communication function into a single module. In one exemplary embodiment, one of the processor modules 110 is realized as a Wi-Fi SoC module.

Figure 2A:
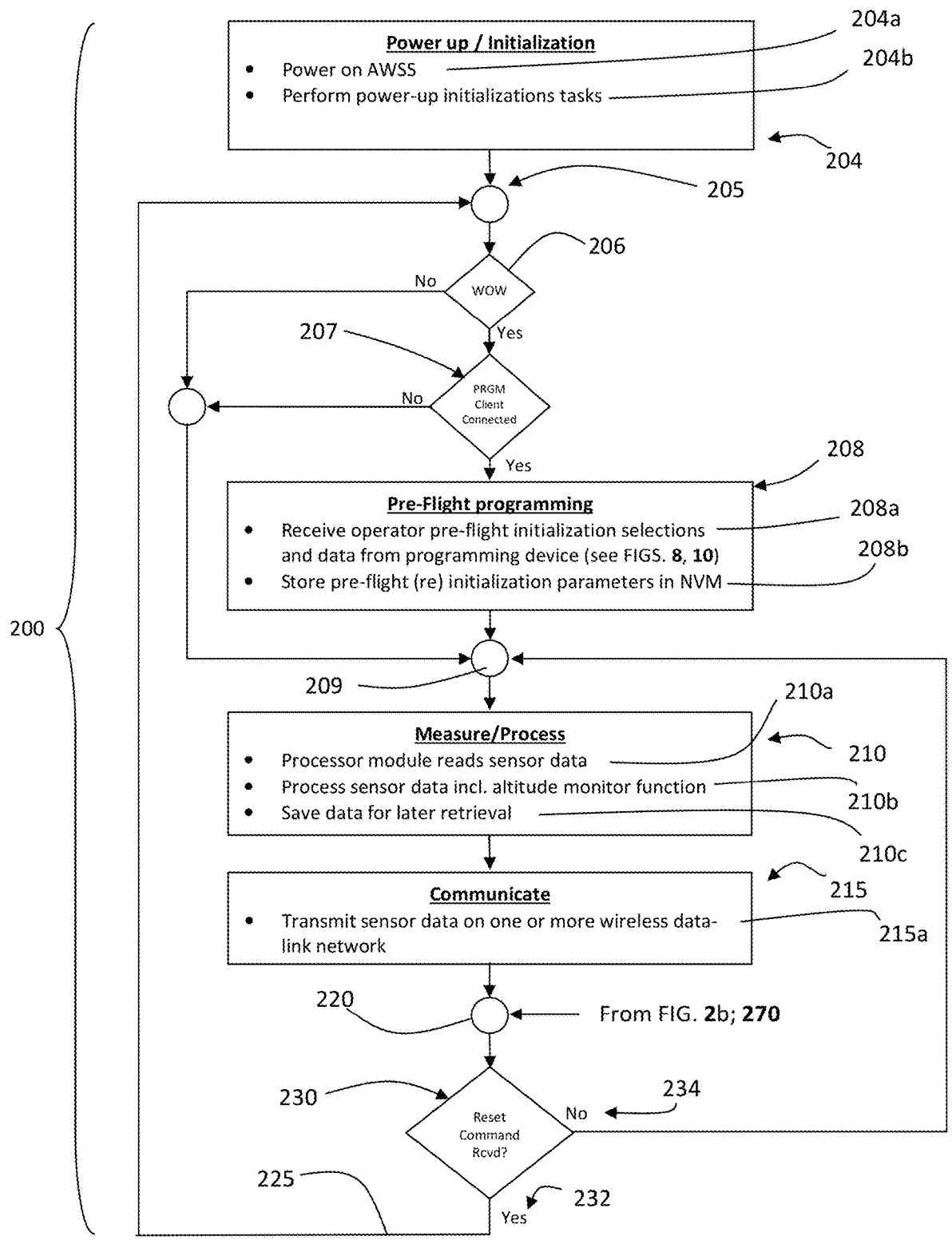
FIGS. 2a & 2b are top level logic flow diagrams illustrating the processes of the airborne and ground processing which might be executed by software applications on the airborne system and remote receiver/display device (RRDD) respectively.

Computer software instructions 112 ('flight code') loaded into the non-volatile memory of processor module 110 when executed may cause the processes 200 in FIG. 2a to be performed. These instructions will, among other things, control the initialization sequence, data collection, and processing reception and transmission/reception of data on the wireless network. The specifics of these functions are described in more detail below in connection with FIG. 2a.

The AWSS 100 may also include a power module 197, which may be electrically connected to the modules requiring power. Choices for the power source include various batteries such as coin cell batteries, LiPo batteries, and the like. Practical considerations for the choice of power module include the voltage, maximum capacity, and maximum current discharge rate, as well as physical concerns such as size and weight. As noted, some components may have a 'sleep mode,' whereby the unit may be temporarily put to sleep for a period of time to conserve power and then reawakened later to resume normal functioning.

Figure 2B:
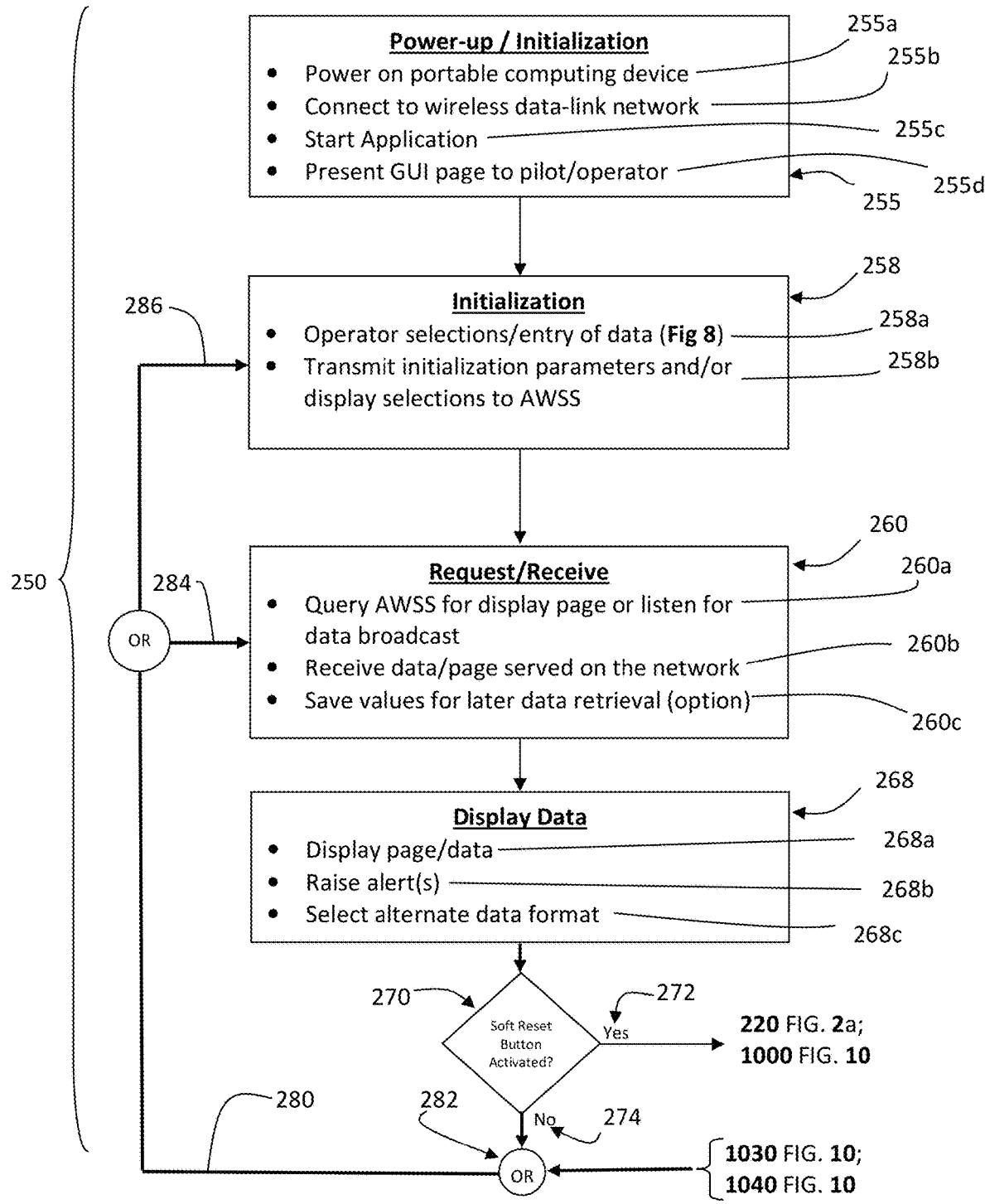

Turning then to a discussion to the processes involved in the operation of the system, FIG. 2a illustrates the initialization, data acquisition, and processing 200 which may be associated with the AWSS 100; and FIG. 2b illustrates the initialization and data entry and display processing 250 which may be associated with the RRDD/programmer/smart device 150. Recall that programmer/smart device 150 is intended to refer not only to a device which may be used during the pre-flight programming but also to receive the UAS AWSS flight data during flight. Note that the tasks and processes depicted in the flow diagram 200 and 250 may be accomplished by different elements of the AWSS 100 and RRDD/programmer/smart device 150, may be executed in hardware, firmware or software, and may be executed in an order different than shown.

In one exemplary embodiment, the process steps of FIG. 2a are implemented in software code 112 ('flight code'), executable by processor 110 on AWSS 100 as described in connection with FIG. 1 above. In another exemplary embodiment, the process steps of FIG. 2b are implemented in software code 162 'app code'), executable by the processor in RRDD/programmer/smart device 150. Note that in conjunction with discussion of data flow on network 199, the AWSS 100 and RRDD/programmer/smart device 150 will sometimes be referred to as the server and the client respectively.

With reference to FIGS. 2a and 2b, whole numbers, e.g. 204, will be used to identify an overall task with sub references e.g. 204a, b, c to identify specific subtasks. Note also the specific sequence of tasks may be varied from that shown in the figures. Additionally, not all steps may be required; some may be bypassed under certain circumstances and executed in conjunction with other steps or may be bypassed entirely.

Beginning first with the process steps in FIG. 2a, and with continued reference to FIG. 1, power-up initialization 204 begins the instruction sequence. Upon power application 204a to AWSS 100, the software code/instruction set 112 may execute a power-up initialization procedure 204b such as setting the control variables on the sensors 120 and communication module 130; setting communication rates between the processor 110, sensors 120, and communication module 130; and initializing variables. Two other initialization functions in 204b are the determination of the zero_AGL_bias to convert measured MSL altitude to AGL altitude and the initialization of the altitude monitor function. Note the initialization of the altitude monitor at this point is before the RRDD has connected to the AWSS to program values. The power-up initialization at 204b is done using default initialization parameters as a placeholder in case the pilot elects not to execute the programming step 208 discussed below. In exemplary embodiments, the default pressure altitude correction factor (CF) is zero. It should also be noted that the zero_AGL_bias and the pressure altitude correction factor (CF) discussed below are two separate correction factors. The zero_AGL_bias is determined based on the raw pressure altitude at ground level (zero AGL) and is applied to later raw pressure altitude measurements to determine a corresponding AGL altitude. The pressure altitude correction factor (CF) compares the raw pressure altitude (MSL) at ground level to the ground elevation (MSL) to determine a pressure altitude bias which can be applied to later raw pressure altitude measurements to determine a pressure altitude value corrected for local pressure. Thus, both the zero_AGL_bias and correction factor must be applied to the raw pressure altitude measurement to determine the AGL and corrected pressure altitude values respectively.

One function of the power-up initialization task 204b may be the computation of the zero_AGL_bias offset. The purpose of this is to compute a bias value which can be used to convert sensed mean sea level (MSL) altitude values into above ground level (AGL) altitude values. As mentioned above, altitude sensor modules generally measure pressure altitude (i.e. MSL), but most UAS regulations relate to AGL altitude. This pre-flight calibration provides a means for converting the measured sensor value into a more useful value.

To determine the bias offset, an initial measurement of MSL altitude is made when the UAV/UAS is first powered on 204a in a process described in detail in U.S. Pat. No. 10,401,166 and U.S. patent application Ser. No. 15/995,314.

Since the UAV/UAS is presumably at or very near the ground at the time of power application, this initial MSL reading serves as a zero AGL reading and thus is called the zero_AGL_bias offset. This initial measurement of MSL altitude is then saved into non-volatile memory 113 of processor module 110. Subsequent measured MSL values may then be converted to AGL by subtracting this zero_AGL_bias offset from the measured MSL value.

Since the zero_AGL_bias is determined at each power-up, suspect or drifting values can be cured by recycling power ("hard reset") and re-establishing the zero_AGL_bias offset value. Thus, if for any reason the UAV/UAS pilot questions the bias value, the unit power may be recycled and a new bias computed. It is further noted that best practice would be to have the RRDD powered during the AWSS initialization. This allows, among other things, for the bias value to be checked (i.e. the RRDD/smart device should show approximately zero while the UAV/UAS is on the ground).

Figure 4:
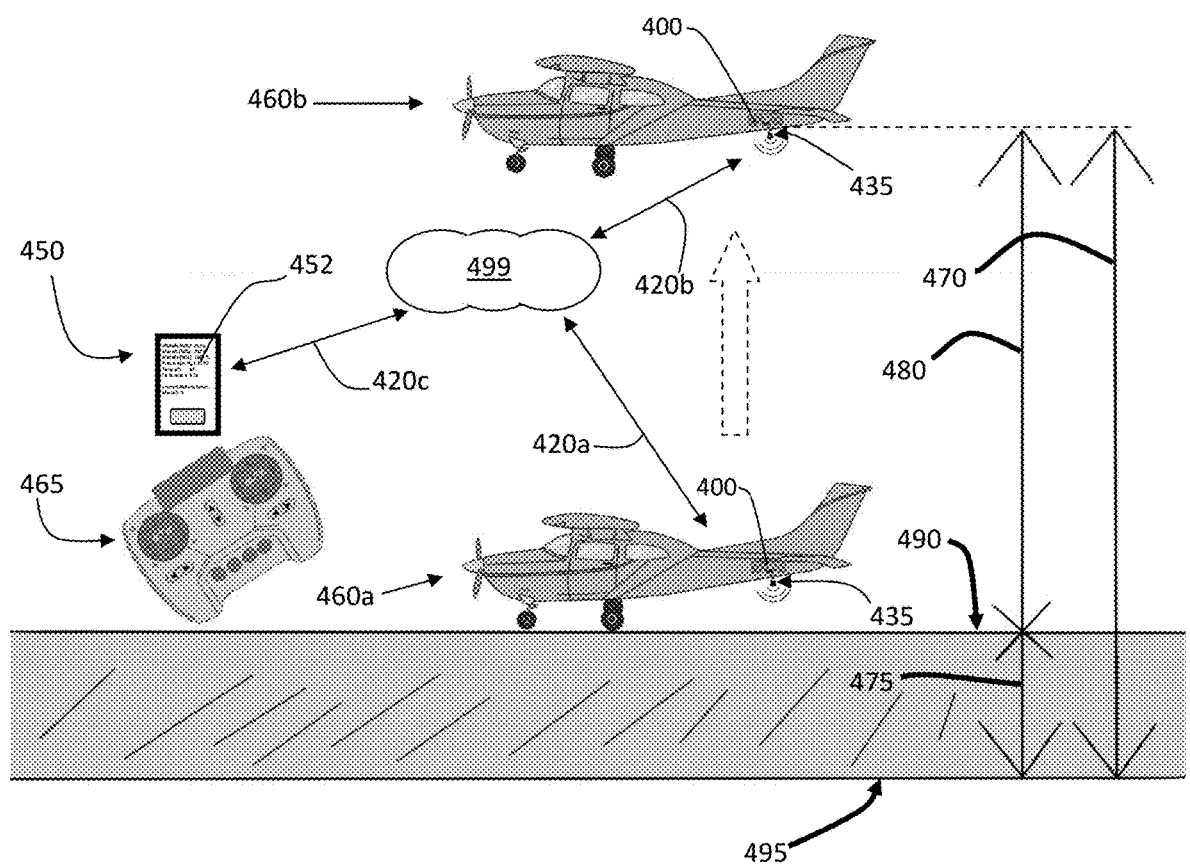
FIG. 4 is an illustration of an exemplary embodiment of the present invention showing the operational environment of the system and process of remotely sensing and displaying UAV/UAS altitude, including a pictorial representation of the different altitudes discussed in the specification.

For the purposes of this disclosure, the terms 'sensed' or 'measured' will refer to the raw data provided directly from the sensor while the terms 'corrected,' 'computed,' or 'converted' shall refer to the data resulting from some processing of the 'sensed' or 'measured' sensor value. One such example is that just provided wherein the measured MSL altitude is converted to AGL altitude by subtraction for the zero_AGL_bias from the measured value. While this initialization step is in an exemplary embodiment shown as accomplished as part of the process 200 performed by AWSS 100, it could also be done in the RRDD/programmer/smart device 150. A pictorial representation of the different altitude quantities is shown in FIG. 4. Note that this initialization of the AWSS 100 may occur before or after it is attached to the UAV/UAS. Another pre-flight task is the pre-flight programming 208. In one exemplary embodiment, the pre-flight programming must occur while the UAS is on or near the ground. After power-up initialization tasks 204, the AWSS checks to see if it is on the ground 206.

The input interface 140 may also comprise a Weight-on-Wheels (WOW) module as discussed above. Recall that the WOW module may either comprise a physical switch detecting that the UAS is on the ground, or may be a virtual 'switch' using altitude as a proxy for weight-on-wheels. Still further, the input interface 140 may comprise a 'hard' configuration switch in the nature of Dual-inline switch (DIP) set to switch positions representing the hardware configuration of the AWSS. Each of these settings or selections, if made, would be saved in the non-volatile memory of the AWSS 100. As mentioned, it is also contemplated that each of these configuration parameters would have a default value 'hard coded' into the instruction set 112 such that no user input is required.

Once the Power-up/Initialization tasks 204 are complete, the code may check to see whether the UAS is in the air or on the ground 206. As mentioned, this may be accomplished using the WOW module 142. The reason the WOW state of the UAS is important is that in some exemplary embodiments, some programming functions may be restricted to situations where the UAS is on the ground. For example, the pilot/operator may set certain initialization parameters on a smart device which may then be communicated to the AWSS via a wireless communication protocol such as WiFi, Bluetooth, or the like. If the UAS is not on the ground (WOW=No), the flight loop (210, 215) may be executed (and the pre-flight programming bypassed) as described below. If the UAS is on the ground (WOW=YES), the pre-flight programming function may be executed. Note that in other embodiments, some programming may occur with the UAS in the air.

If the UAS is on ground (WOW=YES), the code may check to see if a programmer is connected 207. As mentioned elsewhere, a portable programming device (150 FIG. 1) such as a RRDD/smart device may be used for pre-flight programming 208 of the AWSS (100 FIG. 1). Such pre-flight programming may comprise data such as data display format selections (in the case that the AWSS is building the display pages), programming of certain alert conditions or limits, and also the programming of the altitude monitoring module with the altitude initialization parameters. As will be described in more detail below in conjunction with the GUI pages and in conjunction with FIGS. 8 and 10 below, pre-flight programming 208 of the altitude monitoring module may include entering certain altitude initialization parameters, statistical parameters, alerting limits, and the like on the RRDD and transmitting them to the AWSS. In one exemplary embodiment, in this pre-flight programming phase 208, the AWSS establishes a WiFi network acting as an access point. The RRDD may connect to the network after exchanging log-on credentials. In this embodiment, the AWSS acts as a server, serving up pages to the programming device as described below in conjunction with FIGS. 9a-9m. One or more of these pages may contain provisions for entry of certain pre-flight programming parameters, including the altitude initialization parameters. The pilot may then enter initialization/programming data into the RRDD GUI page(s) and then transmit the data to the AWSS 208a. Note that the AWSS code may have factory set default values for all of the programming parameters such that if the pilot does not utilize the programming feature, the factory defaults may be used. In many cases, the default value is zero, especially in the case of corrective offsets. Once the programming parameters are transmitted and received by the AWSS 208a, they may be stored in the AWSS non-volatile memory (NVM) 208b for use during flight processing. The AWSS may then send an indication back to the programmer that the programming parameters have been received and successfully stored.

Once the UAS is in the air (WOW=NO), the measure/process task 210 may begin. Recall that if the pre-flight programming process 208 is not accomplished, the in-flight tasks (210, 215) may proceed using factory default values for any initialization/programming parameters. Recall that one of the initialization tasks 204b accomplished at power-up is the initialization of the altitude monitoring system. At that point the programmer had not connected to the AWSS, and the initialization was done with default parameters. That way, if the pilot elects not to execute the programming task, the system is already initialized with default parameters. Referring once again to the components in FIG. 1, during the measurement phase 210, processing module 110 periodically receives the data output 210a of sensor module 120. In an exemplary embodiment, the sensor module 120 may be surveyed at a constant periodic rate. An alternative embodiment is to acquire sensor data based on execution of an interrupt service routine responding to interrupts by the sensor 120 signaling data availability.

Once raw sensor data has been acquired from sensor module 120, it may be processed 210b. Depending on the nature of the data, the processing varies. For example, if the data is altitude, some computation may occur to accomplish the conversion from sensed MSL altitude to computed AGL altitude, according to the principles discussed above. This is also the step where the altitude monitoring function is executed by the altitude monitoring module 114 in the AWSS flight code 112. This altitude processing may include the correction of the sensed pressure altitude with the correction factor (CF) determined as part of the altitude initialization/programming process mentioned above. Factory set defaults are used if no values are entered or programming does not occur.

As mentioned above, pressure altitude is the accepted measurement for reporting aircraft altitude, both manned and unmanned. Pressure altitude sensors rely on the well established relationship between pressure and altitude. As the aircraft climbs or descends, the pressure changes by a deterministic amount. One drawback is that atmospheric pressure is constantly changing. Thus, aircraft can suffer an apparent change in altitude due to a change in meteorological conditions. Manned aircraft accommodate this by manually resetting their altimeters at certain points during a flight. The present invention teaches a method of accommodating this in unmanned aircraft.

Recall that in one exemplary embodiment, the altitude monitoring system comprises a GPS as a secondary (monitor) altitude source. In that embodiment, the initialization may comprise collecting a plurality of primary and secondary source altitude measurements to establish a baseline of measurements and statistical data related thereto. This data may then be used to characterize and model the relationship between the primary and secondary (monitor) sources. An indication may be provided to the pilot/operator, that the initialization of the altitude monitoring module has been successfully accomplished. In another exemplary embodiment, the secondary monitor may be an inertial measurement unit (IMU), used to sense accelerations in multiple dimensions. In yet another embodiment, both GPS and IMU measurements are used as secondary and tertiary monitor sources. In still a further embodiment, the pilot relies solely on monitoring of the primary altitude system.

As mentioned, in an exemplary embodiment, the primary altitude source is a barometric pressure sensor utilizing the well established relationship between barometric pressure and altitude to provide the altitude measurements. Of course, as any weather observer knows, local barometric pressure is not a constant. When using a pressure sensor to determine altitude, it will be observed that changes in local pressure cause changes in apparent altitude. Since pressure sensors are quite sensitive, non-trivial changes in apparent altitude can be routinely observed even with relatively 'steady' barometric pressure situations. Sometimes changes in local pressure can be more dramatic such as with approaching high or low pressure systems. The secondary monitor systems are chosen for their indifference to atmospheric pressure changes and thus may provide an indication of the validity of any pressure altitude changes as due to physical altitude change versus a change in atmospheric conditions.

In order to ascertain that a meteorological condition has changed one of two methods may be used. First, a direct observation of atmospheric pressure may be made using a barometer such as associated with a weather station. The present invention teaches an alternative method by utilizing one or more secondary (monitor) sensors which are not subject to the same meteorological sensitivities as the primary pressure sensor. In exemplary embodiment, these secondary (monitor) sensors may be a Global Positioning System (GPS) for determining geometric altitude or Inertial Measurement Units (IMU) for measuring accelerations.

Global Positioning Systems measure vertical position (altitude) in addition to lateral (Latitude and Longitude). However, GPS altitude measurements are known to be less accurate than the latitude and longitude measurements. However, while the instantaneous measurement of GPS altitude may be noisy, the median value can be relatively more stable. Thus, in one exemplary embodiment, a GPS moving average altitude is used as a monitor on the pressure altitude to confirm qualitatively that large pressure altitude changes are due to physical altitude changes and not meteorological effects.

Inertial Measuring Units (IMUs) do not, strictly speaking, measure altitude. They do, however, measure acceleration which would correlate with a change in physical altitude (but not with meteorological change). Thus, a change in pressure altitude could be confirmed qualitatively by noting a corresponding change in vertical acceleration.

Execution of the altitude monitor function 210b may include an evaluation of sensed changes in pressure altitude detected by the primary pressure altimeter using the secondary sensors such as the GPS and/or the IMU. The secondary sensors could confirm that the sensed change in pressure altitude is due to a physical change in altitude and not a meteorological change. This confirmation may be qualitative (e.g. transmitting data for display to the pilot evaluating altitude changes) and/or quantitative (e.g. computing one or more validity indicators and alerts). Indications may be provided to the pilot on the remote display of both the secondary sensor(s) output as well as the qualitative or quantitative assessment of altitude changes (see FIG. 9m).

Once the data has been processed 210b, some or all of it may be optionally stored into AWSS memory for later retrieval 210c. For example, in one contemplated exemplary embodiment, the flight data from the AWSS 100 may be retrieved from memory once the vehicle has landed, in order to facilitate post flight data analysis. Conventional data transfer means such as USB port download may be used for retrieval of the flight data, or the data may be stored onto a memory card which can be removed and inserted into a computer or other compatible device for reading.

After data acquisition, processing, and storage, it is ready to be communicated 215 to the remote receiver/display. Communication of data from the AWSS 100 to the remote receiver/display (and vice versa) is facilitated through a wireless network 199. Various types of wireless network protocols have been discussed elsewhere. In one exemplary embodiment, where the UAS remains in close proximity to the pilot such as in recreational or local commercial applications, the wireless network may be a Wi-Fi network. In this embodiment and as described above, the AWSS 100 may be configured as a wireless access point (WAP) with a programmer/smart device 150 operating as a receiver/display client. In this embodiment, the AWSS 100 may act as a 'server,' serving up data and/or 'pages' to be connected upon request of the client. Client/smart device 150 may periodically send requests 260a (FIG. 2b) to which the AWSS/server 100 may respond 215b with 'pages' to be displayed on the client/smart device 150. Of course, in other embodiments where the end user is located considerably farther from the UAS, different communication techniques are employed such as cellular/internet, as described in provisional application Ser. No. 62/990,660 and U.S. patent application Ser. No. 16/914,315.

In the event that the altitude monitor function processing 210b described above indicates that the pressure altitude is being influenced by a change in atmospheric pressure or otherwise adversely affected, the pilot may, at his discretion, determine that a reset is needed. Among other considerations, this may depend on the severity of the miscompare, the location of the UAS, and the time remaining in the mission. If the UAS is in close proximity to the pilot such as on a recreational flight or a local commercial flight, the pilot may choose to land the UAS at or near the take-off point and execute a reset. As was mentioned above, the invention provides a 'soft' reset 230 in addition to a 'hard' reset. Recall that a 'hard' reset consists of powering off, then back on, the AWSS. This power recycle causes the initialization tasks of step 204 and 208 (if so commanded) to be re-executed. This includes a re-initialization of the altitude monitor module (AMM) 114 and specifically a re-reading of the altitude initialization parameters as well as other initialization tasks. Details are provided in connection with the description of FIG. 10 below, but essentially, the execution of many of the initialization functions of 204/208 are re-accomplished. Command of the 'soft' reset 230 would be executed by the pilot, using the remote receiver/display device as described below (see 270 FIG. 2*b*).

The soft reset may allow the zero_AGL_bias reading and other initialization parameters to be reevaluated based on a command from an external source such as from a smart device. In one exemplary embodiment, a button (RESET) may be provided on a graphical user interface (GUI) (FIG. 9*h*, 980), the selection of which may cause a command to be sent to the AWSS (FIG. 2*b*, 270). The AWSS could then read this command 230 and initiate a re-evaluation of the initialization parameters (see FIG. 10 for details).

The code execution loop continuously monitors for an input 220 from the RRDD/smart device 150 commanding a 'soft' reset 230. If no soft reset is received 234, the flight loop continues at 209. If a soft reset is received 232, the return sequence 225 is executed, and the preflight programming may be performed 208 (see also FIGS. 8, 10 for more details).

Referring to FIG. 2*b* and with continuing reference to FIG. 1, the process flow of the RRDD/programmer/smart device 150 is shown. In an exemplary embodiment, the process flow illustrated in FIG. 2*b* could be implemented by the 'app code' 162, resident in the non-volatile memory of RRDD/programmer/smart device 150 which, when executed, could perform the steps illustrated in the figure. For purposes of illustrating features of the present invention, the exemplary embodiment where the AWSS acts as the access point server building 'pages' on the client device is employed. Obviously other implementations could be employed such as where the RRDD/programmer/smart device builds its pages, exchanging data with the AWSS via JSON or other protocols.

Smart device application process begins with power application 255*a*. The user then connects the RRDD/smart device to the AWSS network 199. The connection process 255*b* uses procedures common and well understood by users of smart devices and may be done either manually or automatically, depending on how the smart device user has configured his device settings. Also, as is common in networking, the server/AWSS 100 may have configuration settings such that a password is required to connect to the network 199, thereby protecting the network from unauthorized access.

The application itself may then be started 255*c* subsequently or concurrently with accessing the wireless network. After the application is executing, an initial GUI 'page' or 'screen' may be presented to the pilot/operator 255*d*. In one exemplary embodiment, the initial page displayed is the altitude initialization page (ALTITUDE MODULE INITIALIZATION), encouraging pilots to initialize the altitude system. In an alternative embodiment, the initial page displayed is the HOME page, giving the pilot the option of proceeding directly to flight operations with a default data screen display or to the initialization pages and display option selections. This is discussed in much greater detail below in conjunction with FIGS. 8 and 9. After accessing the desired pages, the process may move to the initialization sequence 258.

The initialization procedure 258 may begin by processing the pilot selections 258*a*. In one scenario, the pilot proceeds immediately to the fly option, bypassing the entry of initialization data and display selections where a default set of flight data is displayed. As mentioned above, if the operator chooses to bypass the initialization process, default initialization parameters may be used.

If the operator opts for a more customized initialization process, a series of GUI pages (FIGS. 8, 9) may be presented to the operator on the RRDD/smart device 150. These pages allow the operator to select a variety of options associated with initialization, operation, and display of data. One of these is the entry of initialization parameters associated with the altitude monitoring module (AMM) 114. These options will be discussed in more detail below in conjunction with FIGS. 8, 9, and 10. After the selections are made, they are transmitted 258*b* to the server/AWSS 100.

As mentioned above, as part of the AWSS initialization sequence 208, the AWSS 100 may send smart device 150 an indication that the AWSS 100 initialization has been completed. Smart device 150 may optionally display some indicator from AWSS 100 that the selections have been received and the initialization complete.

After completing the initialization task 258 the smart device 150 may begin receiving data 260 from the AWSS 100. In one embodiment, with the AWSS performing as a server/access point, the request/receive task 260 may send a page request 260*a* through network 199 to server/AWSS 100 for a display page containing the selected UAS flight data for display. The display page may be transmitted to the RRDD using a protocol such as the hypertext transfer protocol (HTTP) or the like.

In another embodiment, the AWSS 100 may continuously transmit UAS flight data in a standard protocol such as JSON, for reception and display 268*a* by the smart device 150. In this embodiment, the instruction code 162 of client/smart device 150 might create its own page formats for displaying 268*a* sensed data, using the data sent by the AWSS as the data source but presenting the data in a format maintained by the smart device 150. It is also contemplated that received data may be saved into memory 260*c* for retrieval after the flight and used in post-flight data analysis.

Another feature of the display task 268 may be the performance of an alerting function 268*b*. This may be a feature enabled during the initialization process 258*a* by entering certain monitor alert limits (see also FIGS. 8, 9 and 10). If this function has been enabled, an alert may be generated upon activation of the alerting condition. There may be multiple alerting conditions defined. As just one example, if the received altitude exceeds the legal 400 AGL limit, the smart device display area (170 FIG. 1) may display an alert in the form of an annunciation, 'blanking' the display area, 'dashing' the displayed data, or the like (see FIG. 9*g*).

A further optional feature of the display task 268 may be the selection of an alternate data display format 268*c*. The user may be given the option of displaying data in different formats (data display format selection) (see FIG. 8). This option may be initially presented on the 'HOME' screen 255*d*. In addition, the operator may be given the chance to change formats at any time by the presentation of the option selection data display pages 268c. The return path 280 may be determined by whether the user selects an alternative display format or if the 'soft' reset has been selected.

If the pilot selects an alternate display format, then the flow returns to 258, whereby the selection may be made. In one exemplary embodiment, the display selection may be transmitted to the server (AWSS 100) for building the page in the newly selected format; otherwise, the selection is retained in the RRDD for controlling display format. If no alternative format has been selected, the flow returns to the receive task 260.

Figure 9E:
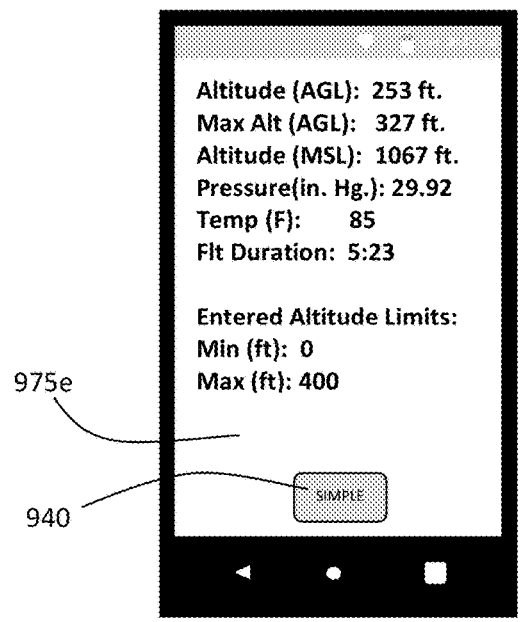
Figure 9F:
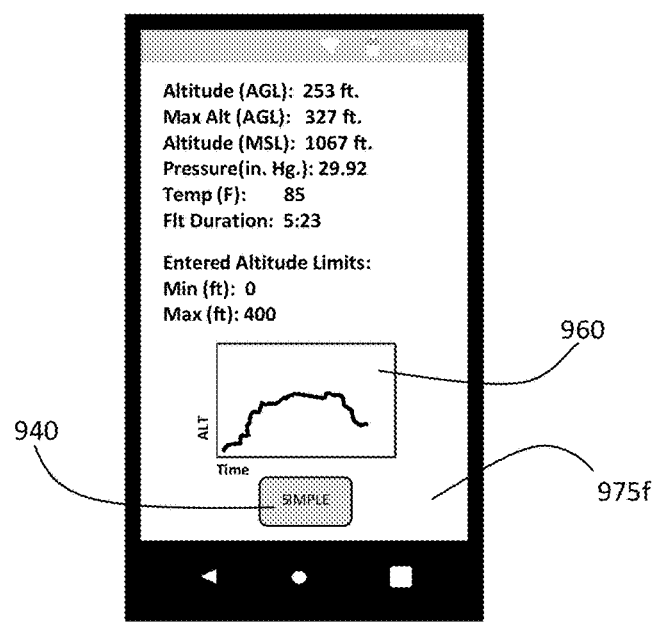
Figure 9G:
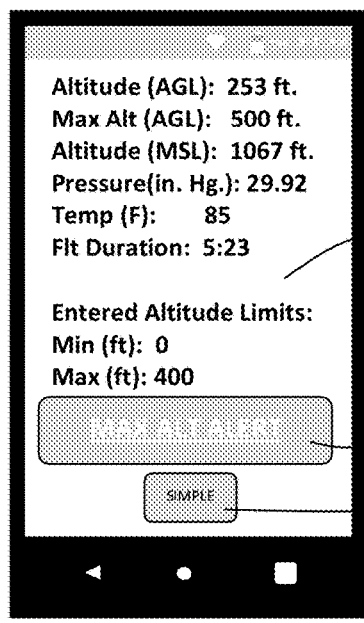
Figure 9H:
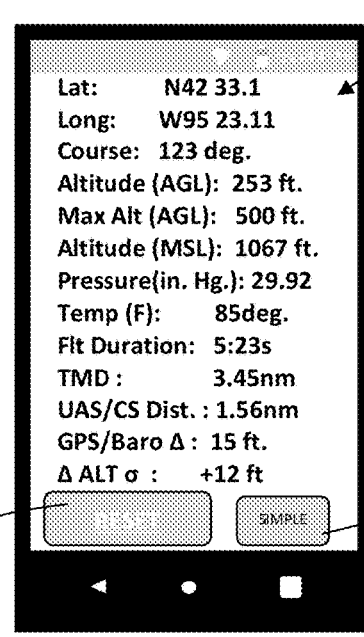

The RRDD continually checks to see if the pilot has selected the 'soft' reset button 270 (980 FIG. 9h). Activation of the RESET button 272 causes the command to be transmitted back to the AWSS (FIG. 2a, 220). Reception of the command by the AWSS executes the logic flow illustrated in FIG. 10.

In an exemplary embodiment, the instruction set 162 is executed in a continuous loop. In such a cyclic execution, once the page display is accomplished 268, the process returns 280 to the initialization task 258, to the request/receive task 260, or to execute the soft reset function 270 (depending on selections made if any). The execution loop may execute a preprogrammed delay.

It should be apparent that the steps, tasks, and functions described above may be performed by software, hardware, or firmware. It should also be apparent that additional or alternative steps relative to those described below may also be performed. Also steps may be reordered from what is shown.

Figure 3:
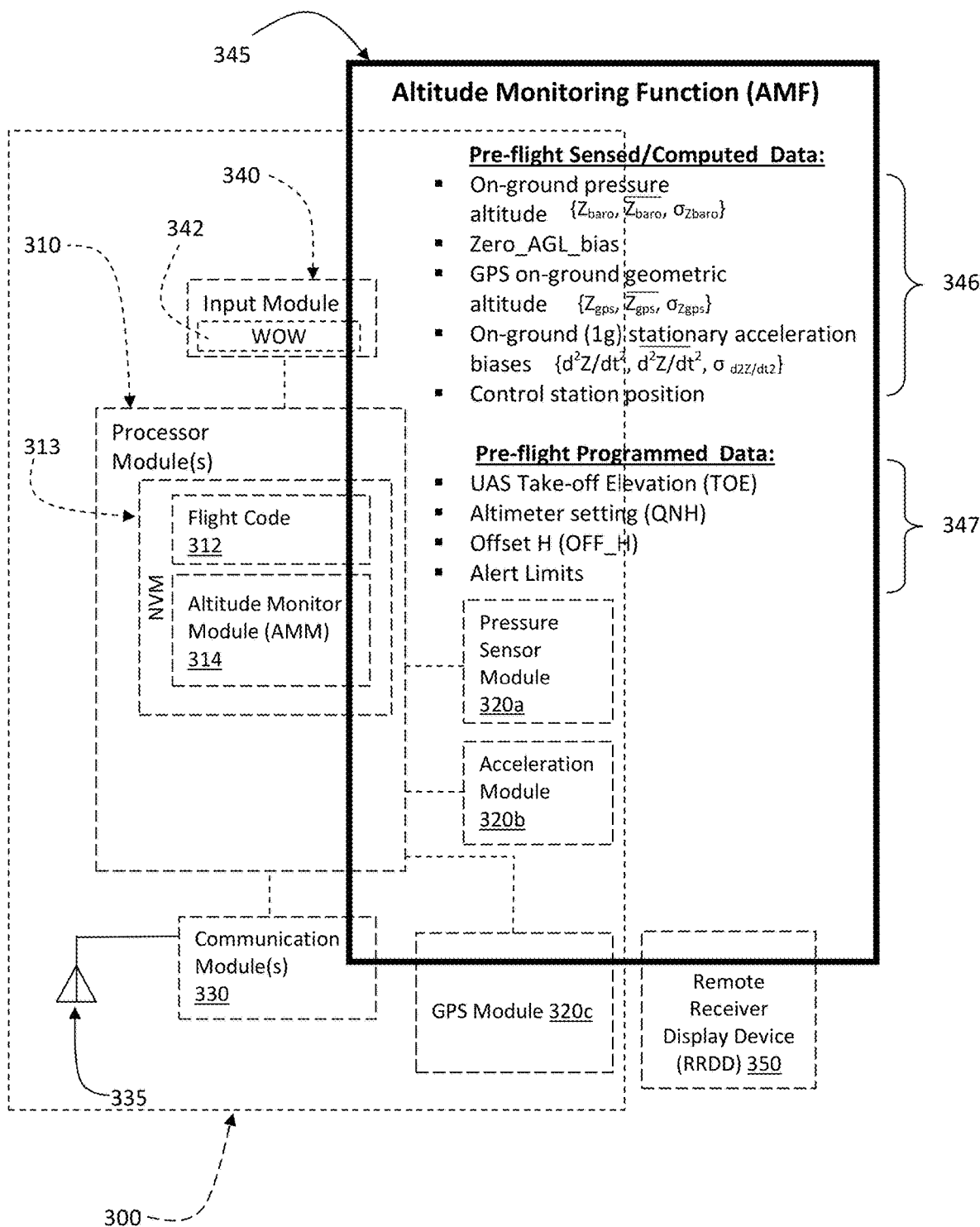
FIG. 3 is a block diagram showing the altitude initialization and monitoring system (AIMS) functionality and its interface with the AWSS and RRDD.

FIG. 3 illustrates the altitude monitor function (AMF) 345 and how it interfaces with various components of the AWSS 300 system and the remote receiver/display device (RRDD) 350. The altitude monitor function (AMF) 345 is a conceptual construct used to identify and discuss its functional features, including the initialization process and how the function utilizes various physical components of the system to implement the function. As described above, in one exemplary embodiment, the altitude monitor module (AMM) 314 is a reserved section of NVM 313 where the programmed altitude initialization data resides. Further functional features of the AMF are executed in the flight code 312 by processor 310 using data from sensors 320a, 320b, 320c.

As was mentioned above, the altitude initialization data may comprise two categories of data: the pre-flight sensed/computed data 346 and the programmed initialization data 347. The programmed data 347 component of the altitude initialization data may include alert limits used to identify the triggering point for altitude related alerts and data used to correct the raw sensed pressure altitude reading for local meteorological conditions. The altitude alerts might be maximum altitude (MAX_ALT (AGL)) and minimum altitude (MIN_ALT (AGL)), and also alerts related to the monitor function such maximum delta altitude (MAX_$\Delta$_ALT), maximum mean pressure altitude standard deviation (MAX_PBAR_$\sigma$), maximum mean GPS altitude standard deviation (MAX_ZGPSBAR_$\sigma$), and maximum mean z axis standard deviation (MAX_VDOT_$\sigma$). The correction factors might be UAS take-off zone elevation (TOE) measured from mean sea level (MLS), local altimeter setting (QNH), or an offset height (OFF_H).

As mentioned, these values are used to compensate the raw sensed pressure altitude and need not all be entered. In fact, they are all different sides of the same coin and only one of them is necessary to correct the raw data. Which one is entered depends on what data is available. If the current altimeter setting is available from a local airport, that may be used. If the take-off elevation (TOE) is known, that may be used; otherwise, an offset altitude or height (OFF_H) may be used. However, to determine the offset height, the TOE and sensed pressure altitude must be known so the TOE is the preferred entry since that never changes for a given spot. Operationally, manually entered TOE would be used to compare to the raw sensed pressure altitude while the UAS is on the ground. The difference between the two is the OFF_H which would be used to add to (or subtract from) the raw sensed pressure altitude to arrive at the corrected pressure altitude. So the TOE can be entered to determine the OFF_H or the OFF_H can be entered directly. In the case of conflicting entries, the following priority may be assigned to the entries: take-off zone elevation (TOE), local altimeter setting (QNH), offset height (OFF_H).

As mentioned, in one sense it may be preferable to use the TOE, in that the elevation of the take-off point of a given spot never changes, whereas the OFF_H must be re-determined based on current atmospheric conditions. Thus, the TOE and the on-ground raw pressure altitude may be used to compute the new OFF_H value 'under the hood.' The OFF_H, whether manually entered or computed, can then be used by the processor to continuously correct the sensed pressure altitude for the local conditions throughout the remainder of the mission or until reset during the re-initialization process. Alternatively, some pressure sensors such as the NXP MPL3115A2, allow the OFF_H to be written into a sensor register. In that case, the pressure altitude is corrected internally within the sensor. Similarly, if the altimeter setting is entered, it can be used to determine a pressure offset used to correct the raw sensor readings. Any of the methods is acceptable, but if the correction is applied 'outside' the sensor, then both the raw and corrected values are available for display. This is especially true when computing AGL altitudes, since as was discussed above, the zero_AGL_bias is applied to the raw pressure measurement, not the corrected value. It should be noted if this correction data is not entered, there are defaults that may be used. In the case of the altitude initialization, OFF_H would be set to zero, i.e. no correction applied. It should also be noted that in cases where continuous sensor values are discussed, e.g. on-ground raw pressure altitude, it might be desirable to take an average of several values when making a determination of OFF_H so as to average out some of the sensor noise.

The pre-flight sensed/computed data component 346 of the altitude initialization data comprises readings with the UAS on the ground prior to take-off (e.g. the on-ground pressure altitude, the computed zero_AGL_bias, the z-axis (1 g) acceleration, and the GPS on-ground geometric altitude). This data is then used in the computations of altitude corrected for local meteorological conditions (if initialization data is entered via the programming page) and is also used to establish a baseline data for statistical analysis of the primary altitude source in view of the secondary (monitor) source(s). The altitude monitor function (AMF) 345 function provides the pilot/operator the means for entering this altitude initialization data and verifying the AWSS altitude monitor module 314 output prior to flight. As was mentioned earlier, the pilot may use or disregard this data when performing the monitoring task.

As mentioned, the altitude monitor module (AMM) 314 is drawn separately from the AWSS NVM 313 to highlight both its function within the larger altitude monitor function (AMF) 345 and to illustrate its programmability separate from the remaining NVM 313. To illustrate the role that each of the system components may play in the altitude initialization programming function, the box representing the altitude monitor function 345 initialization is shown overlaying input module 340 (including the WOW module 342), the processor module 310, the flight code 313 and altitude monitor module 314, the communications module 330, and the remote receiver/display device (RRDD) 350 which may be used for pre-flight programming the altitude monitor module 314 with the altitude initialization data, as well as display of UAS flight data during the mission. Additionally, the pressure sensor 320*a*, acceleration 320*b*, and GPS modules 320*c* are shown. The GPS module 320*c* is shown partially enclosed by the altitude monitoring function 345 because its main function in the AWSS architecture is to provide horizontal position (latitude and longitude) to the system.

The pressure sensor 320*a*, acceleration 320*b*, and GPS modules 320*c* are providers of the altitude related data to support the altitude monitor function. The pressure sensor 320*a* is the primary sensor used for UAS altitude reporting. The accelerometer sensor 320*b* and/or GPS sensor 320*c* may be used in the monitoring function. Any change in physical altitude of the UAS would be accompanied by a positive or negative acceleration, depending on whether it is an ascent or descent. Similarly, a change in UAS physical altitude would result in a change in GPS altitude. Thus a valid change in altitude can be confirmed by noting a corresponding acceleration or GPS altitude change. As mentioned, the pilot may use the data provided by the monitor systems when monitoring the output of the primary sensor, but it is not necessary. The monitor function may consist simply of the pilot monitoring the primary altitude sensor. Additionally, alerts may be set up to monitor the relationship between the primary and secondary sensors, as discussed elsewhere in the specification.

In an exemplary embodiment, a communication module 330 on the AWSS 300 establishes a wireless network to which the remote receiver/display device (RRDD) 350 may connect. Upon operator command, the RRDD may display one or more pages listing the various altitude initialization parameters as well as other configuration items which may be defined and/or specified. The pilot may then execute the program function by selecting the 'PRGM' button (947*l* FIG. 9*l*) which would transfer the entered/modified data over the wireless network to the AWSS 300, where it would be written into the altitude monitor module 314 in AWSS NVM. In an exemplary embodiment, any entered altitude initialization data is erased upon landing of the UAS. Note that programming of altitude initialization data may be restricted to when the UAS is on the ground (weight on wheels (WOW)=ground). (As noted above, WOW 342 is intended to cover both a physical WOW switch and a virtual switch). The input module 340 may comprise the weight-on-wheels (WOW) module 342 used to determine if the UAS is on the ground or in the air.

FIG. 4 illustrates how the present invention would be employed in a typical use scenario, specifically in the embodiment where altitude is one of the monitored flight data. In the figure, the UAV/UAS 460 is shown in two positions 460*a* and 460*b*, corresponding to an initial ground position and an airborne flight position respectively, to illustrate the process of the invention whereby AGL altitude 480 may be computed.

Referring to the figure, a variety of altitudes and elevations are depicted. Reference numeral 495 represents Mean Sea Level (MSL). Reference numeral 490 represents the ground level, and 475 represents the elevation of the ground level above sea level (zero_AGL_bias). Altitudes 470 and 480 both represent the altitude of the UAV/UAS. Altitude 470 represents the UAV/UAS altitude relative to mean sea level, referred to generally as xxx feet MSL, and 480 represents the UAV/UAS altitude relative to the ground level, referred to generally as xyz feet AGL. Thus, it is clearly seen from the figures that the altitude of the UAV/UAS above the ground 480 is represented by its altitude above sea level 470 minus the elevation of the ground 475. (i.e. in reference numeral terms, measured msl_altitude 470—elevation 475=agl_altitude 480). Thus, ground elevation 475 represents the zero_AGL_bias discussed above.

As discussed above in connection with the initialization tasks in 204, zero_AGL_bias 475 may be determined when power is initially applied to the (AWSS) 400 when the UAV/UAS is sitting on or near the ground as shown in the FIG. 4 as position 460*a* (t~=0). Once acquired, the zero_AGL_bias 475 may be saved off in non-volatile memory in the altitude monitor module 114. Subsequent altitude measurements are adjusted for this value by the process described above, to obtain the real time UAV/UAS AGL altitude, e.g. 480.

The AWSS 400 transmits the altitude values and/or other data to the smart device 450 via wireless network 499. Depending on operator selections made, both the sensed/measured MSL altitude as well as the computed AGL may be transmitted. Wireless network 499 may comprise WiFi, V/UHF, satellite, cellular/internet, or other protocols. As mentioned, RRDD/smart device 450 may be a phone, portable data assistant, laptop, desktop, smartwatch, or the like. RRDD/smart device 450 may be removably attached to ground control station 465 or may be positioned elsewhere within visual proximity of the remote pilot (see FIGS. 6 and 7). Still further, if the smart device takes the form of a smartwatch, the device may be worn on the wrist (see FIGS. 5 and 7).

Communication from the airborne unit 400 to the smart device 450 via wireless network 499 may be facilitated through antenna 435, which, in addition to airborne unit 400, is shown in exaggerated size and position so as to illustrate its existence. As mentioned in an exemplary embodiment, the antenna may be a printed circuit board (PCB) trace antenna which could substitute for the external antenna 435 shown in the figure. Communication may also be conducted from the RRDD/smart device 450 to the airborne unit 400 via wireless network 499 for setting display parameters, formats, and the like, as discussed elsewhere. Communication to and from wireless network 499 may take place when the UAV/UAS is on or near the ground 460*a* (via path 420*a*) or airborne 460*b* (via path 420*a*). (Initialization programming may be restricted to on-ground situations)

RRDD/smart device 450 is shown in the figure to utilize a display area 452. In an exemplary embodiment, display area 452 may be realized as display screen on a smartphone, tablet, or the like, but could also be a display on a laptop, smartwatch, etc. Whatever its form, its purpose is to display the altitude and/or other data transmitted by AWSS 400. Displayed data may be in the form of textual and/or numerical data and/or may include graphical representations as described more fully below. Additionally, it is anticipated the smart device 450 might be removably attached to the ground control station 465; in other embodiments, the smart device 450 may be positioned remotely from the ground control station 465 but proximate to the remote pilot or the Visual Observer.

Figure 5:
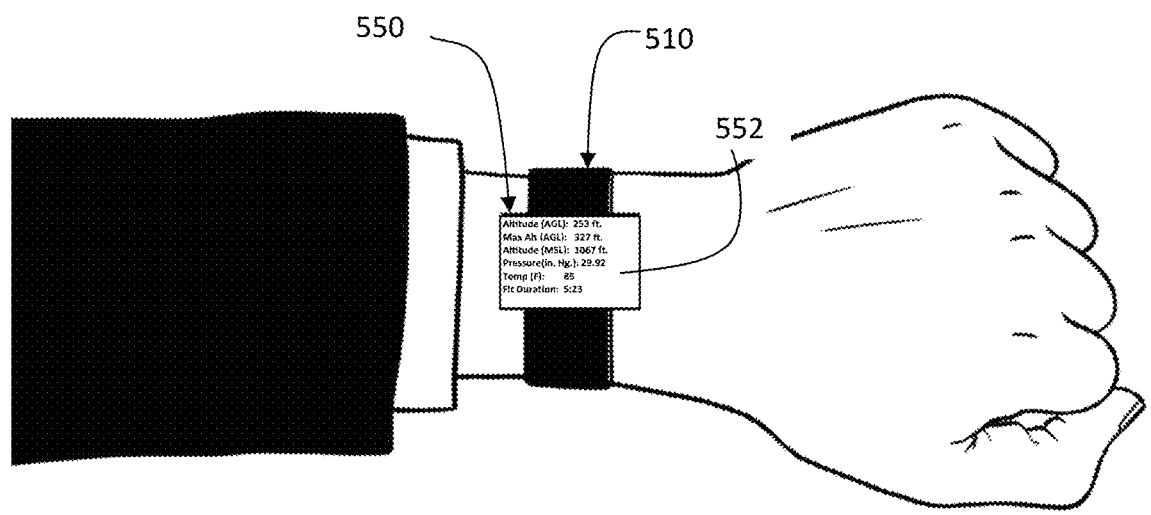
FIG. 5 illustrates an exemplary embodiment of the smart-watch realization of a remote receiver/display device.

FIG. 5 shows another exemplary embodiment wherein the portable computing device or smart device is a smartwatch 550. Smartwatches are a relatively new phenomenon, combining the features of a watch and a computer, similar to the combination of the computer and phone to create the smartphone. Because of their relative newness, functionality is developing rapidly. Some smartwatches include the ability to communicate through a wireless network by integrating a Wi-Fi and/or Bluetooth wireless connectivity as part of the device. Similar also to smartphones, smartwatches utilize various operating systems (OS) to perform their computing functions. Some current examples of smartwatch operating systems are watchOS (Apple), Android (Google), Android Wear (Google), iOS (Apple), as well as other proprietary operating systems. The particular OS utilized is unimportant as long as the watch system allows applications to be loaded into the watches' non-volatile memory for execution by the watch processor. For example, one of the app stores mentioned previously may allow for the download of apps to the smartwatch.

As illustrated in FIG. 5, smartwatch 550 comprises many of the same elements as a traditional digital watch. Smart device 550 may be secured to a wrist band 510 which may be in turn removably secured to the wrist in the traditional fashion. Smartwatch 550 includes a display system 552 for displaying various data. Typical display technologies employed include Organic Light Emitting Diode (OLED), Active-Matrix OLED (AMOLED), and Passive-Matrix OLED (PM-OLED). In typical utilization, the smartwatch may be capable of displaying text and graphics.

The physical size of the display system 552 may be smaller than that of other smart devices such as a smartphone, table etc. Thus, the amount of data which can be displayed may be more limited than for the larger devices. Nonetheless, sufficient space exists for the display of important data such as altitude and alerts. It is envisioned the watch may be worn on the wrist of the remote pilot or worn by the Visual Observer who could call out altitudes at the pilot's request. Alternatively, the smart watch could be strapped to some appendage of the control station.

As described in more detail below in conjunction with FIG. 7, it is anticipated that smartwatch 550 could be connected through wireless network directly to the AWSS or via a wireless relay to another smart device. Reception and display of data would be similar to that as described for other smart devices such as the smartphone. The smartwatch could be connected to the wireless network as thereafter present requests to the server/AWSS for data pages which would be transmitted and displayed on the smartwatch.

Figure 6:
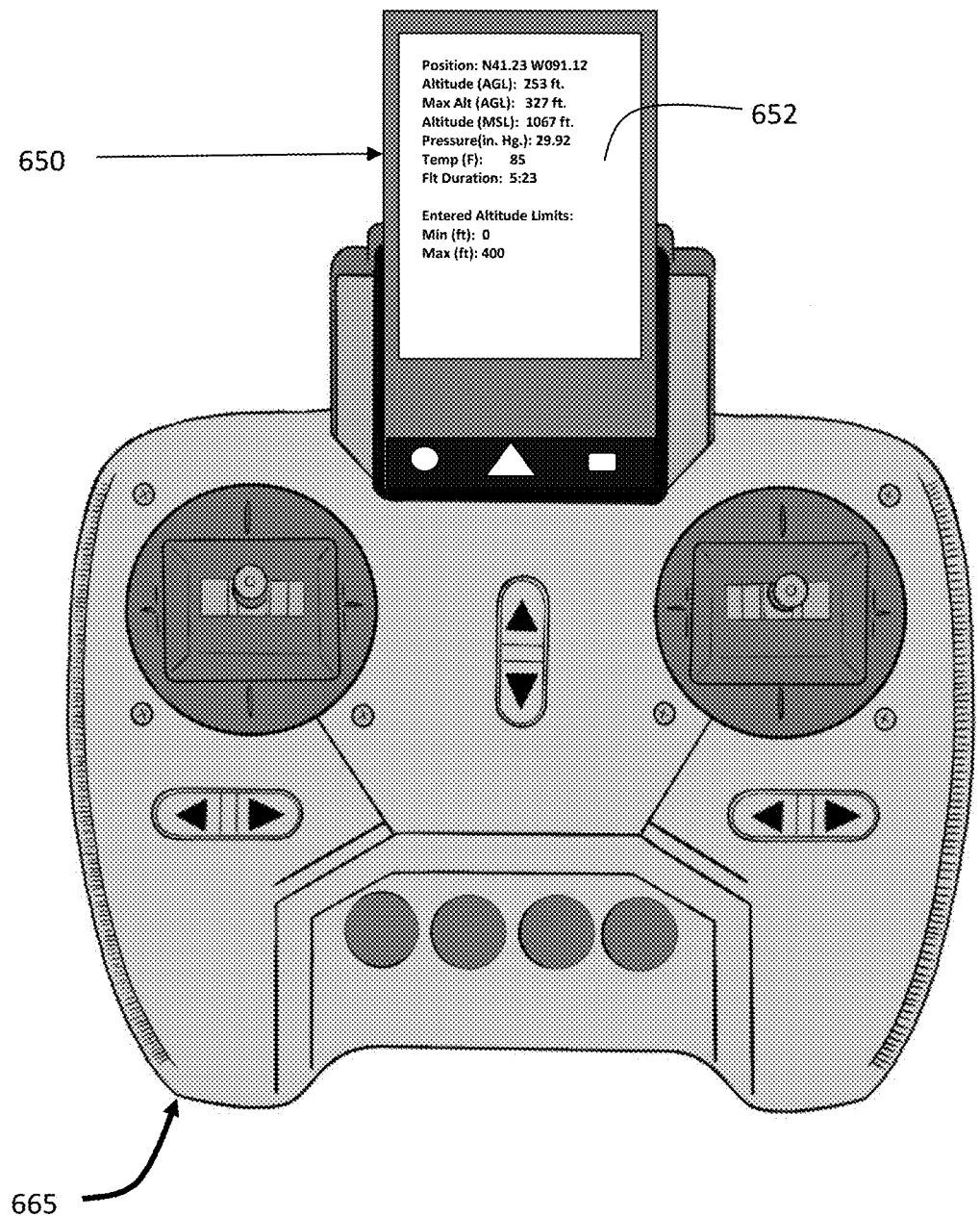
FIG. 6 illustrates another exemplary embodiment of a remote receiver/display device, realized as a smartphone, and how it might be mounted to the hand controller ('control station') of the UAV/UAS.

FIG. 6 illustrates an alternative exemplary embodiment where the smart device 650 may be removably attached to a ground control station 665. Attachment may be by any or a number of means such as a cradle, bracket, or even Velcro®. Numerous ground control stations 665 come with a bracket device adapted to cradle a smartphone or similarly sized smart device in a position for easy viewing during flight operations. As seen in the figure, the smart device 650 may be placed in a position such that the display screen 652 faces the remote pilot when operating the ground station 665 controls. This positioning maintains a visual orientation that permits the pilot to maintain a close visual inspection of the flight data.

Figure 7:
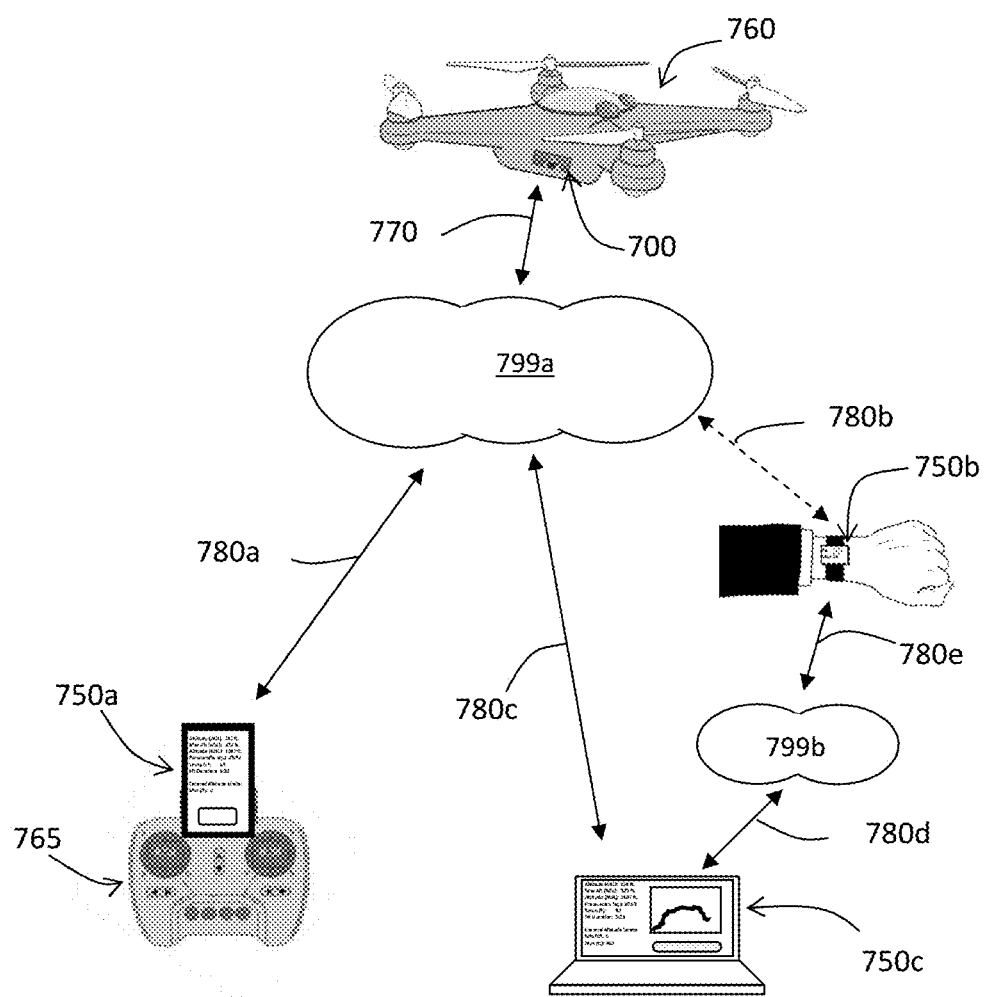
FIG. 7 illustrates a network topology with the connection of a plurality of remote receiver/display devices to the AWSS through one or more wireless data networks.

FIG. 7 illustrates one embodiment of a wireless data network of the present invention and its employment in various modes of operation with a plurality of smart devices 750a-c and a plurality of networks 799a, b. In a first illustrative embodiment, AWSS 700 may be attached to airborne UAV/UAS 760, transmitting altitude and/or other data to the wireless network 799a via radio path 770. One or more smart devices, for example 750a, 750b, and/or 750c, connect to the wireless network 799a using RF signals 780a, 780b, and 780c respectively. As described above, in a preferred embodiment, wireless network 799a may be a Wi-Fi network. In other embodiments, wireless network 799a may be a Bluetooth wireless network, and in still other embodiments, both Wi-Fi and Bluetooth may be utilized. For example, connection path 780a to smart device 750a may utilize the Wi-Fi protocol, while communication path 780b may utilize the Bluetooth protocol.

In a second illustrative embodiment, multiple wireless networks may be utilized wherein a smart device may receive data via a relay path instead of a direct connection to network 799a. As an example of that embodiment, one smart device may connect directly to a first wireless network via a first RF path, while a second smart device may connect to the first smart device via a second wireless network. One use for such an arrangement is where one of the devices is too large or too heavy to be positioned in proximity to the pilot or where one of the smart devices does not have adequate communication power or proper protocol to communicate directly with the AWSS. An example is illustrated in FIG. 7.

First smart device 750c may be a laptop or tablet, or the like, located remotely of the ground controller, say for example, on a table, ground, or the like. Second, smart device 750b may be a smartwatch or the like, worn by the pilot or remote observer. Smart device 750c could receive the signal transmitted by the AWSS 700 through first network 799a via a first RF path 780c. First smart device 750c may then relay the received data via a second RF path 780d through second network 799b to the second smart device 750b through path 780e. Additionally, the first and second networks 799a, 799b need not necessarily utilize the same wireless protocol. For example, first network 799a might be a Wi-Fi network for RF path and the second network 799b might utilize the Bluetooth protocol for paths 780c, 780d. Employment of this embodiment might be beneficial when the desired display device e.g. 750b lacks the ability to communicate directly with the first network 799a. For example, perhaps its communications module has insufficient receiver sensitivity, or perhaps its wireless technology protocol is incompatible with the first network. In that situation, a larger device, perhaps with greater communications capability or range or which employs protocols of both first and second networks, can be used as a 'base station' which receives a signal from one network and relays the signal out on another network. As just one example, a laptop or tablet 750c may be used as the first smart device operating as a base station receiving data from Wi-Fi network 799a and rebroadcasting the data over a Bluetooth network 799b to a smartwatch 750b.

Figure 8:
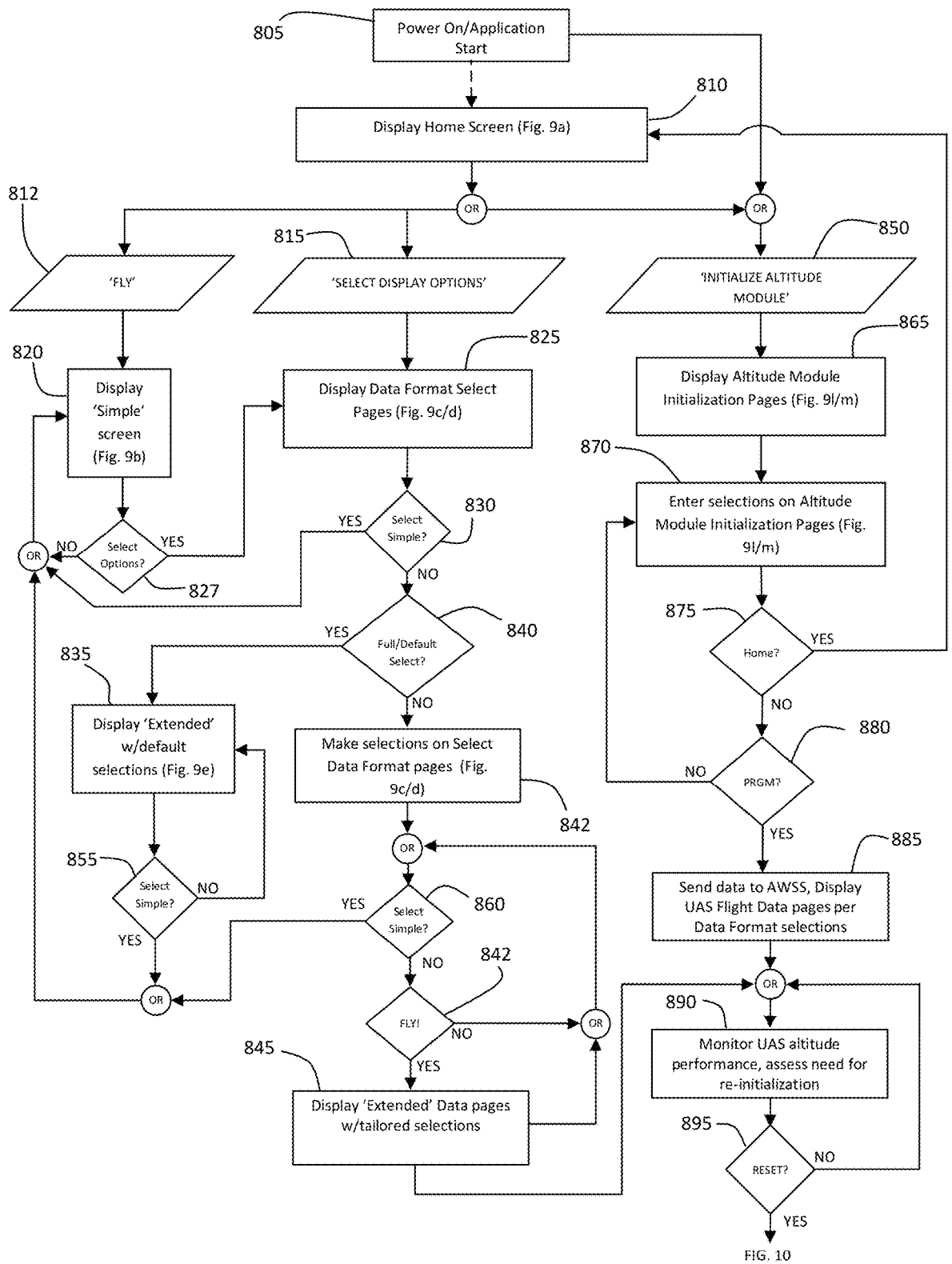
FIG. 8 illustrates one example of a process executed by the remote receiver/display device 'app code' including operator selections, entry of altitude initialization data, and data display format selections. The process steps are correlated to graphical user interface (GUI) screen shots in FIGS. 9a-9m.

FIGS. 8 and 9a-m will be discussed together, due to the overlap of the subject matter. FIG. 8 illustrates one embodiment of page tree/display selection logic executed by the app code 162 on the remote receiver display device (RRDD) (150 FIG. 1). Note that remote receiver/display device (RRDD) 150 is also sometimes referred to as the 'client device,' 'smart device,' and programmer, depending on functionality context being discussed and refers generally to a device with input, display, and communication means, allowing data to be exchanged with the AWSS. For example, in some programming implementations, the RRDD (150 FIG. 1) may function as a client device with the AWSS functioning as the access point/server. Regardless of nomenclature, the RRDD (150 FIG. 1) provides a means for wirelessly communicating with the AWSS both for pre-flight programming as well as the reception and display of UAS flight data during the mission. FIGS. 9a-m illustrate some screenshots of graphical user interfaces (GUIs), illustrating various possible initialization/programming, format selection, and data display pages on the RRDD (150 FIG. 1). When describing the display interfaces in FIGS. 8 and 9a-m, reference will also be made back to the process functions in FIG. 2b.

In an exemplary embodiment, upon activation of the RRDD application 805 (162 FIG. 1; FIG. 2b), the initialize altitude function selection 850 is automatically activated, causing the ALTITUDE MODULE INITIALIZATION pages to be displayed 865 (FIGS. 9l, m). This implementation encourages the pilot to enter the optional altitude initialization parameters before accomplishing any other task. On this screen, the various altitude initialization parameters may be entered as discussed below. In an alternative embodiment, a 'HOME' screen may be presented 810 (FIG. 9a, 975a) upon activation of the RRDD application. From this screen, the operator may decide if he is ready to proceed immediately to flying with the minimum (default) set of display parameters 812, whether he/she desires to select a more specific set of display parameters 815, or whether the altitude monitor module is to be programmed 850. Recall that there is no functional requirement for the programming of the altitude monitor. The flight may be conducted using default values for the initialization parameters. An altitude alert may still be issued if the UAS altitude exceeds the FAA part 107 limit of 400 feet AGL based on a defaulted limit value. Other altitude related alerts may be dependent on the programming of the altitude monitor module and may not occur without programming. Similarly, there is no functional requirement for display data selections to be made. The flight may proceed with the default set of display parameters.

If the decision is to proceed immediately to flight with a so-called 'simple' display set 812, the 'FLY' button (905 FIG. 9a), may be selected on the HOME page which may result in the 'simple' display 820 format set such as shown in FIG. 9b. The 'simple' format would be a more limited data set of parameters. Shown in FIG. 9b for illustrative purposes are current (computed) altitude (AGL) and the max mission altitude (AGL). Current (computed) AGL altitude would, of course, be the raw pressure altitude currently sensed by the sensor module compensated for the zero_AGL_bias value as discussed above. Max mission altitude might be the maximum altitude sensed by the sensor since the most recent 'hard' reset (power (re)application) or 'soft' reset (commanded from the RRDD) to the AWSS 100. For US versions of the device, the default display units may be in feet. European or other metric unit countries may have the default units in meters. Display units selection may be one of the items available on the data format selection pages. The format shown in FIG. 9b is but one example. In addition to the computed AGL altitude, the measured (raw) MSL altitude may also be displayed (and/or corrected pressure altitude if altitude initialization has been completed). In the exemplary embodiments, the operator would be given an option of selecting the alternative data display format. Thus, when the 'simple' format display is shown as in FIG. 9b, a SELECT OPTIONS button selection 827 (930 FIG. 9b) may be available to switch to the 'extended' format display.

As an alternative to the 'simple' display format, the 'SELECT DISPLAY OPTIONS' button (815 FIG. 8; 910 FIG. 9a) may be selected on the HOME page to tailor the display of UAS flight data. Selection of the 'SELECT DISPLAY OPTIONS' button (910 FIG. 9a) results in the display of multiple pages (FIGS. 9c-d), allowing the operator to select or deselect various parameters for display and item for entry. It must be noted here that the display sets shown in the figures are for illustrative purposes only. It is obvious that various data parameters may be substituted for the ones shown. The point is that the operator is given choices as to what data is to be displayed. As noted in the exemplary embodiments, the operator would be given an option of selecting between the alternative data display format. Thus, when the 'extended' display is active, the choice 855 would be given to switch to the 'simple' display (940 FIG. 9d).

Turning now to a description of the display options selection 815, selection of the SELECT DISPLAY OPTIONS button (910 FIG. 9a) on the 'HOME' page causes the display of the DATA DISPLAY OPTIONS page ½ (FIG. 9c) to be displayed. The operator may be given the option of returning to the 'simple' format display 830 (914 FIG. 9c) or proceeding immediately to a 'full' format display with default parameters 840 (916 FIG. 9c). If the pilot opts for a detailed list of selection options 842, a units selection may be provided for data display; the options may be imperial (920 FIG. 9c) or metric units (918 FIG. 9c). The operator then may have the option of entering alert limits such as minimum altitude (MIN_ALT (AGL)) (926 FIG. 9c), maximum altitude (MAX_ALT (AGL)) (928 FIG. 9c), and a Beyond Visual Line of Sight (BVLOS) limit (927 FIG. 9c). Note that even if no altitude alerts are entered, the AWSS may still monitor for compliance with the FAA's 400 foot AGL limit for part 107 operations (14 CFR 107). The operator may have a choice of displaying a graph (922, 924 FIG. 9c). In an exemplary embodiment, the graph is a visual representation of the altitude versus time. The operator may then choose to move on to the second of the display data format pages by selecting the NEXT button (926 FIG. 9c) or select the FLY button (929c FIG. 9c).

At the bottom of the page, a 'FLY' button (929c FIG. 9c) may be presented. If at any point the pilot selects the FLY button (929c FIG. 9c; 929d FIG. 9d), the current selected display format options are used. Thus, if the pilot selects FLY(929c FIG. 9c) at the bottom of page ½ without making any selections on page 2/2, the pilot is then taken to a default 'extended' data display page (FIG. 9e), thereby bypassing the data toggle selection page FIG. 9d. Having bypassed the data toggle page (FIG. 9d), the default selections of the toggles would be used 835. If, instead, the operator chooses the NEXT selection (932 FIG. 9c), the second DATA DISPLAY OPTIONS page 2/2 may be provided (FIG. 9d). As seen in the figure, a series of ON/OFF toggles is presented for each of the possible data items (970a-970i FIG. 9d). Selection of ON causes the parameter to be displayed and selection of OFF causes the parameter to be hidden. The list of items shown is for illustrative purposes only, and the actual list may contain more, less, or different items. In one exemplary embodiment, the parameters of altitude (AGL), maximum altitude (AGL), altitude (MSL), Pressure, Temperature, Flight Duration, Entered Altitude Limits, BVLOS/TMD distances, and altitude monitor data toggles may be presented. While an exemplary list of display parameters has been shown for illustration, it will be clear that numerous other parameters are available, such as position, accelerations, altitude trend vector, battery status, and the like.

Once the desired toggle settings are selected, the operator may select the FLY button 842 (929d FIG. 9d) at the bottom of the page, which would then result in the display of data pages reflecting the selected parameters 845. Examples illustrating different settings are shown in FIGS. 9e-h. Also, at the bottom of the extended format pages is the SIMPLE selection 860 (940 FIGS. 9*d-h*), the activation of which would return the operator to the display shown in FIG. 9*b*.

FIG. 9*e* illustrates an example page where the 'extended' format with the graph toggled to OFF has been selected. An illustration of an 'extended' data page with the graph toggled ON is shown in FIG. 9*f*.

As described in connection with FIG. 9*c*, the operator may be given the opportunity to enter maximum altitude (MAX_ALT (AGL)) and minimum altitude (MIN_ALT (AGL)) alert limits. The purpose of such entry may be to provide an alert to the pilot when either of the limits is exceeded by the UAS in flight. There are many options for the nature of the alert but in one embodiment, the display may be 'blanked' or the display of altitude 'dashed' when the limit is exceeded. In an exemplary embodiment, an annunciation 950 may be raised at the bottom of the screen, such as is illustrated in FIG. 9*g*. Opportunity for entering altitude alert limits may also be provided on the ALTITUDE MODULE INITIALIZATION pages (FIG. 9*l*).

In addition to initialization, the invention teaches use of an altitude monitor function for monitoring the UAS altitude and determining the need for a re-initialization of the altitude system. As part of the altitude monitoring function, the pilot may be given the opportunity to program the altitude monitoring module 850. This may be done from the 'HOME' screen by selecting the ALTITUDE MODULE INITIALIZATION button (912 FIG. 9*a*) or as mentioned, in one exemplary embodiment; the ALTITUDE MODULE INITIALIZATION page (FIG. 9*l*) is automatically displayed 850 upon RRDD power application/application activation. This implementation encourages the pilot to enter the optional altitude monitor initialization parameters. If the pilot chooses not to enter the initialization parameters, he may select the HOME option 875 (945 FIG. 9*l*) to display the HOME page. As mentioned, if the pilot chooses not to enter parameters, defaults may be used for the altitude initialization.

The ALTITUDE MODULE INITIALIZATION page (FIG. 9*l*) gives the pilot the ability to enter certain parameters associated with the monitoring function. Whether accessed manually from the HOME page or automatically at start-up, one or more initialization pages such as FIGS. 9*l*, 9*m* may be displayed 865. In an exemplary embodiment, the initialization pages consist of a first page FIG. 9*l* for entering correction parameters 952, 954, 956 used to correct the raw sensed pressure altitude for local meteorological conditions and some alert values used to generate one or more alerts or that may be used as re-initialization indicators and which may be accessed from the ½ page by scrolling down in the conventional sense 890. A second page FIG. 9*m* for displaying some of the altitude monitoring quantities may also be provided. If the pilot chooses to enter altitude initialization parameters, they may be entered 870 on the ALTITUDE MODULE INITIALIZATION page (FIG. 9*l*). The pilot may enter a take-off elevation (TOE) 952, an offset height (OFF_H) 956, or an altimeter setting (QNH) 954. These are all different sides of the same coin. Entering one determines the other two. Entering the field elevation at the take-off elevation (TOE) specifies the MSL elevation of the UAS on the ground. The difference between this value and the raw sensed pressure at the ground level determines the offset height (OFF_H). Thus, either value may be entered with the same effect. However, the take-off field elevation (TOE) is the preferred entry because this value would not change (assuming the same take-off spot of course). Conversely, the offset height (OFF_H) would change as the on-ground raw pressure altitude measurement changes with changes in atmospheric pressure. The altimeter setting (QNH) is the current pressure setting for an altimeter to read the proper elevation at the take-off point, which changes as the local pressure changes.

Additionally, the pilot may be given the opportunity to enter some alerting limits 958, 962, 964. In one embodiment, the monitor alert limit might be associated with a 'delta' ($\Delta$) altitude, e.g. the altitude difference between the primary and secondary sources such as Max $\Delta$ altitude (MAX_$\Delta$) 958, as discussed above. Another example might be an alert when the delta altitude drifts beyond a specified limit (MAX_$\Delta$_$\sigma$) 962 or when the source data becomes unstable (measured by a large standard deviation in the data) (MAX_$\sigma$) 964. Another might be a maximum variance indicating unstable sensors. The idea is that if an uncommanded altitude changes outside this window, a re-initialization may be necessary. Clearly, there are other statistical measures which could be monitored. Note that changes in altitude may be part of the flight plan. This may produce short term spikes in the statistical measures during climb/descents until a stable altitude is achieved. But these would be expected as part of planned flight maneuvers.

Once the desired parameters are entered 870, the program button ('PRGM') (9471 FIG. 9*l*) may be selected 880, sending the values to the AWSS. In an exemplary embodiment, the display then automatically jumps to a UAS flight data display 885 (e.g. FIGS. 9*e*, 9*f*, 9*g*, 9*h*). In an alternative embodiment, the display automatically jumps to the HOME page after programming is complete. Should the pilot desire not to enter initialization programming data or after entering data elects not to program it, he may manually return to the HOME page 875 by selecting the HOME button (945 FIG. 9*l*). The pilot may also 'scroll down' to page 2/2 of the initialization page to see some of the live data output by the altitude monitor module. This data may be used to judge the quality of the altitude data during flight and assess the need for a re-initialization. The data may also be used to judge when the statistical sampling of the altitude and monitor sources has converged enough for take-off, such as allowing the GPS to achieve a good fix. The page may be accessed at any time during flight.

As a further part of the altitude monitoring function, the invention teaches use of a 'soft' reset used to initiate a re-initialization of the altitude system when indicated 895. As mentioned, the monitoring to determine the necessity of a re-initialization may be qualitative or quantitative. The monitoring may involve secondary monitor system(s) or may rely solely on pilot's observation of the primary altitude sensing system. Secondary monitor systems may be useful in determining whether changes seen in the UAS pressure altitude are valid changes due to actual physical changes in the UAS altitude by providing a source of altitude information unaffected by changes in meteorological conditions.

Various statistical measures may be used to assist in the determination of UAS altitude change validity. As mentioned, secondary (monitor) sources may be employed to validate changes in the primary system. These secondary sources should be sources which are not affected by the same processes which may cause the erroneous readings in the primary system. Two such systems might be an Inertial Measurement Unit (IMU), measuring accelerations in the x, y, and z axes, and a Global Positioning System (GPS), capable of measuring position in the x, y, and z planes. These two systems measure altitude or changes in altitude using processes unaffected by changes in atmospheric pressure and might already be integrated as part of the AWSS system for determining other UAS flight data.

As was discussed above, it is well known that GPS altitude is not nearly as accurate or stable as horizontal position determinations (latitude and longitude). In addition, the GPS altitude can be quite 'noisy,' showing a standard deviation many times larger than the horizontal position. Notwithstanding the noisiness of the raw data, the mean is relatively more stable. One method might be to establish a baseline difference between the raw primary sensor altitude and the mean of the GPS altitude, including a standard deviation of the difference. An indicia of validity might be to examine when the difference between the primary altitude source and the monitor source (e.g. GPS) exceeds a multiple (e.g. 1×, 2×) of the standard deviation or variance of the difference. If an altitude change is due to a physical change in altitude, both the GPS and the pressure altitude should change. A change in one without a change in the other is an indicator that something other than physical altitude is driving the change. It might also be desirable to monitor the GPS altitude value itself to 'validate' its use as a monitor source. This validation monitor might consist of a standard deviation of the GPS altitude, making sure it is within some acceptable level. This might also be monitored before flight to determine that the GPS altitude solution has converged.

Another secondary (monitor) source may be an IMU/accelerometer. Inexpensive accelerometers are available which can measure small changes in acceleration. Of course accelerometers measure change in acceleration in the x, y, and z plane and are independent of changes in atmospheric pressure. Changes in pressure altitude lacking a corresponding change in vertical acceleration might reasonably be ascribed to meteorological or other conditions (e.g. sensor failure) rather than flight reasons. The displayed data on the altitude module initialization page 2/2 (FIG. 9m) may provide multiple pieces of monitor data and thus give the pilot some flexibility in what measures to use for monitoring the primary altitude source as well as the quality of the monitor data itself. For example, some data may appear to be too noisy (e.g. excessive standard deviation) and thus judged as too unreliable for monitoring purposes. Some possible parameters for display include the raw (sensor) pressure altitude, the corrected pressure altitude, the GPS altitude, the standard deviation of GPS altitude, the GPS/baro delta, the standard deviation of the GPS/baro delta, the Z acceleration, and the standard deviation of the Z axis acceleration. This data is an extension of the data that may be listed on the flight data page (see FIG. 9h).

As mentioned, in one exemplary embodiment, entries enabling a correction factor (CF) to be determined are provided, e.g. local take-off elevation (TOE) (952 FIG. 9*l*), an altimeter setting (QNH)(954 FIG. 9*l*), or offset height (OFF_H) (956 FIG. 9*l*). These may be used by some pressure altimeters such as the NXP MPL3115A2 to internally calibrate the altimeter to local atmospheric conditions. In an exemplary embodiment, the correction is made external to the sensor so as to preserve the raw sensor reading for display, in addition to the corrected value, for pilot situational awareness (FIG. 9*m*). Also as noted above, some corrections may be applied to the raw sensor reading instead of the corrected value, e.g. zero_AGL_bias.

FIG. 9*h* illustrates an example page displaying flight data 975*h*, including a Reset selection button 980. More specifically, both UAS flight data 935 and altitude monitoring data 937 are shown. The flight data, along with the altitude monitor data (937 FIG. 9*h*; FIG. 9*m*), may be used to determine the need for a reset (i.e. re-initialization) of the AWSS altitude system. The RESET button (980 FIG. 9*h*), when activated, commands the 'soft' reset/re-initialization function described below in conjunction with FIG. 10.

In addition to the typical position and altitude data, FIG. 9*h* also illustrates some additional parameters which may be displayed to the operator. For example, a total mission distance (TMD) traveled and a distance from control station (UAS/CS Dist) may be displayed. In the case of the distance from control station, a simple calculation of the distance between the control station and the current positions may be made (see FIG. 12*a*). The total mission distance traveled may be made using a continuous accumulation of incremental distances. For example, each pass through the code could compute the distance between the current position and the last measured position and that distance added to an accumulation register of distances. Thus, the last incremental distance is added to the accumulated distances, creating a new updated total. This is described in more detail below in conjunction with FIG. 12*b*.

$$TMD = \sum_{i=1}^{n} TMD_i$$

Figure 10:
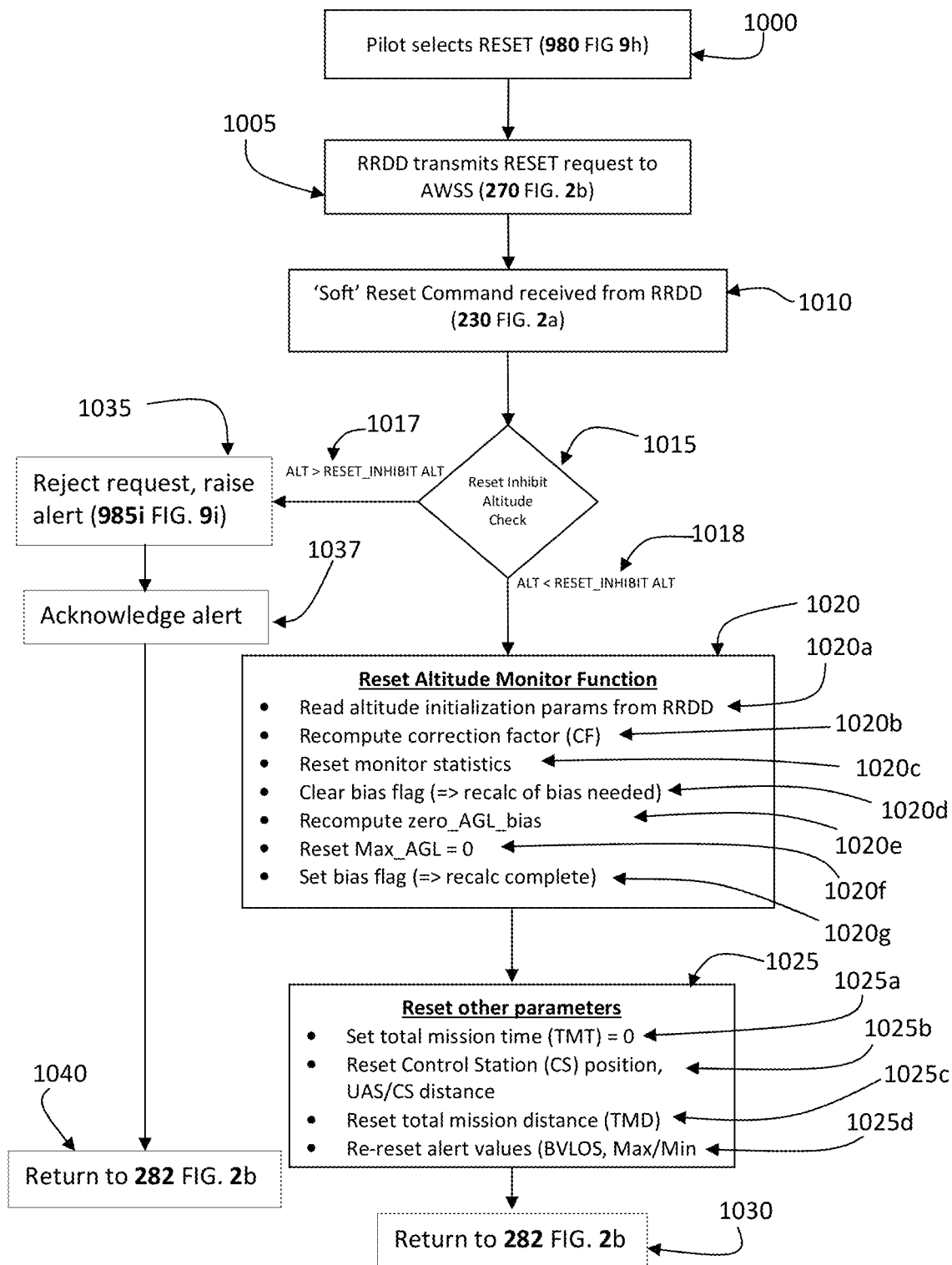
FIG. 10 illustrates a top level logic flow of the AWSS 'soft' reset process of the present invention.

FIG. 10 illustrates the AWSS code logic implementing the 'soft' reset/re-initialization function. The soft reset function is to be distinguished from the 'hard' reset which is accomplished by powering the device OFF and back ON. The functions may be similar, but the 'hard' reset requires physical access to the device so as to allow for access to the power switch. In contrast, the 'soft' reset function may be accomplished remotely of the device, using the remote receiver/display device (RRDD) which eliminates the need for access to the power switch. This greatly simplifies the resetting operation, allowing the reset to be accomplished more rapidly and with greater safety, e.g. while the propellers are still turning.

The soft reset function allows a resetting of power-up defaults. A prime example is the zero_AGL_bias. The soft reset function allows the easy recalibration of the bias altitude. Recall the zero_AGL_bias is the value in feet of pressure altitude when the UAS is on the ground. Thus, subsequent pressure altitude readings may be converted to an AGL altitude by applying the bias value to the sensor measured value. The reset function also resets the total mission distance (TMD), maximum mission altitude (MAX_ALT (AGL)), total mission time (TMT), and control station/UAS (CS/UAS) distance in addition to resetting the altitude initialization parameters with respect to the altitude and other initialization values; they will be reset to their entered value when the RESET button is activated. Thus, entered values should be verified prior to activating the RESET button.

With reference to the AWSS code logic implementing the 'soft' reset function illustrated in FIG. 10, whole numbers, e.g. 1020, will be used to identify an overall task with sub references e.g. 1020*a, b, c* to identify specific subtasks. Note also the specific sequence of tasks may be varied from that shown in the figure. Additionally, not all steps may be required; some may be bypassed under certain circumstances and executed under others or may be bypassed entirely.

The soft reset function is initiated by the pilot selecting RESET on the smart device GUI screen or page 1000 (980 FIG. 9*h*). The RRDD/client device then transmits the reset request to the airborne wireless sensor system (AWSS) 1005

(270 FIG. 2b), where it is received and processed 1010 (230 FIG. 2a). As part of the reset function, there may be certain tests or checks performed before executing the reset. For example, using the situation of the bias altitude reset, it may be desirable to limit a reset of the bias altitude when the UAS is on or very near the ground. In that case, an altitude check might be built into the reset logic 1015. For example, in embodiments without a physical weight-on-wheels (WOW) switch to determine physical contact with the ground, a 'virtual' WOW in-air determination might be inferred if the AGL altitude exceeds a specified 'reset_inhibit_altitude' (RIA) 1017. If so, the reset of the altitude bias might be inhibited. If the UAS altitude is lower than the 'reset_inhibit_altitude', the reset may proceed 1018. Note that the proper procedure once a re-initialization determination has been made is to land the UAS, re-enter or verify as correct the entered initialization parameters, then select RESET.

Figure 9I:
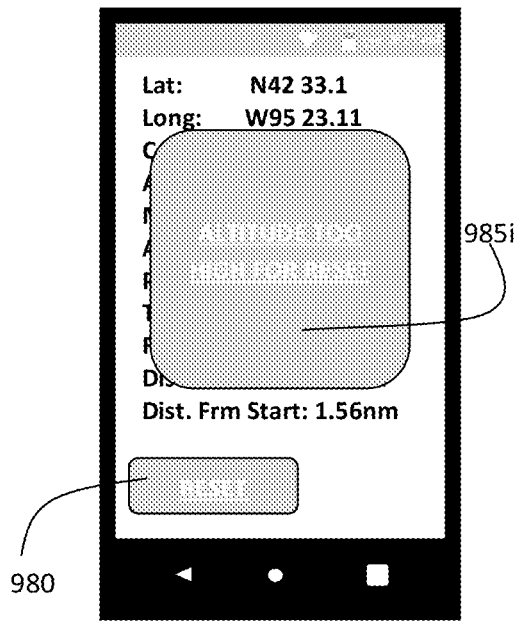
Figure 9J:
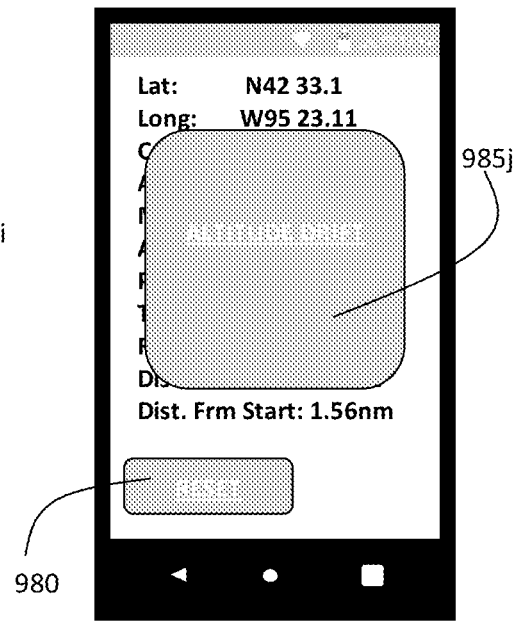
Figure 9K:
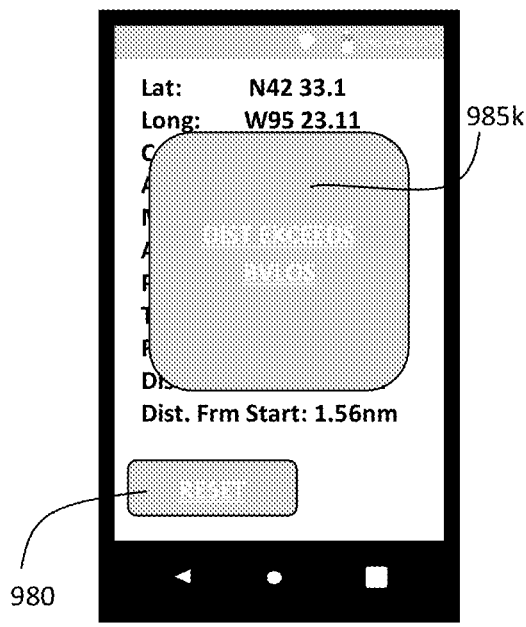
Figure 9L:
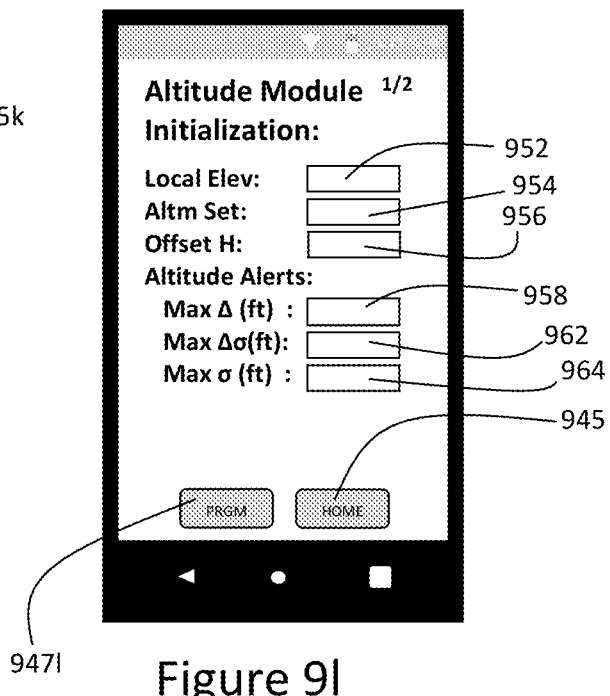
Figure 9M:
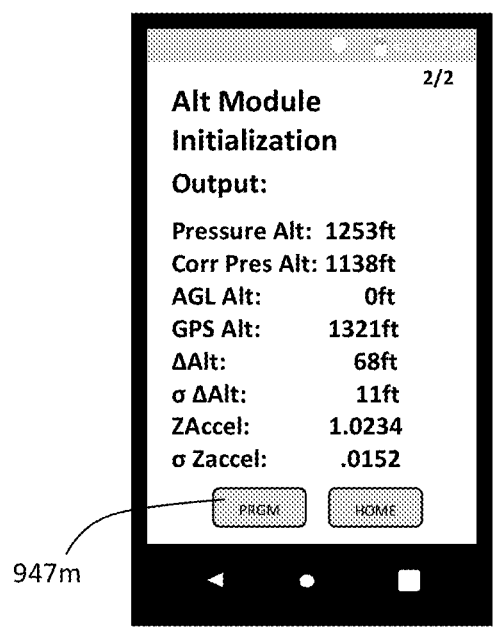

If the reset is inhibited because the UAS altitude exceeds the altitude limit 1017, in addition to the resetting function being inhibited, a visual alert may be raised on the smart device 1035 (985i FIG. 9i). Once displayed, the software code may require acknowledgement of the alert 1037 before proceeding. Acknowledgement may be accomplished simply by touching the screen alert icon (985i FIG. 9i) or by other means. Once the alert acknowledgement has occurred, the smart device code resumes its execution 1040 (282 FIG. 2b). In the situation where the software inhibit must be over-ridden, the hard reset option (recycle power) option (255 FIG. 2b) is always available.

Assuming any implemented checks are passed 1018, the reset function may be executed 1020. In the case of the altitude module reset/re-initialization 1020, the altitude initialization parameters discussed above may be re-read from the RRDD 1020a and a new correction factor (CF) computed 1020b based on the initialization parameter entries and the current on-ground pressure altitude reading. As noted above, the initialization parameters are read at the time the RESET button is activated. The monitor statistics such as the mean and standard deviation values may then be cleared 1020c. The bias altitude flag may be cleared 1020d, indicating to the software executing in the device that the zero_AGL_bias altitude needs to be recomputed and the current AGL altitude set to zero (the UAS is on the ground) 1020e. The max altitude value may be cleared/reset 1020f, and the bias altitude flag set 1020g to indicate the bias reset is complete.

Other non-altitude parameters may also be reset 1025; for example, the flight duration timer (TMT) 1025a, the UAS/control station distance 1025b, and distance traveled TMD) 1025c, etc may all be reset. Additionally, the alert limit values may be reset to the last entered values 1025d. Once the reset function has been completed, the code returns to its execution cycle 1030 (282 FIG. 2b).

Figure 11A:
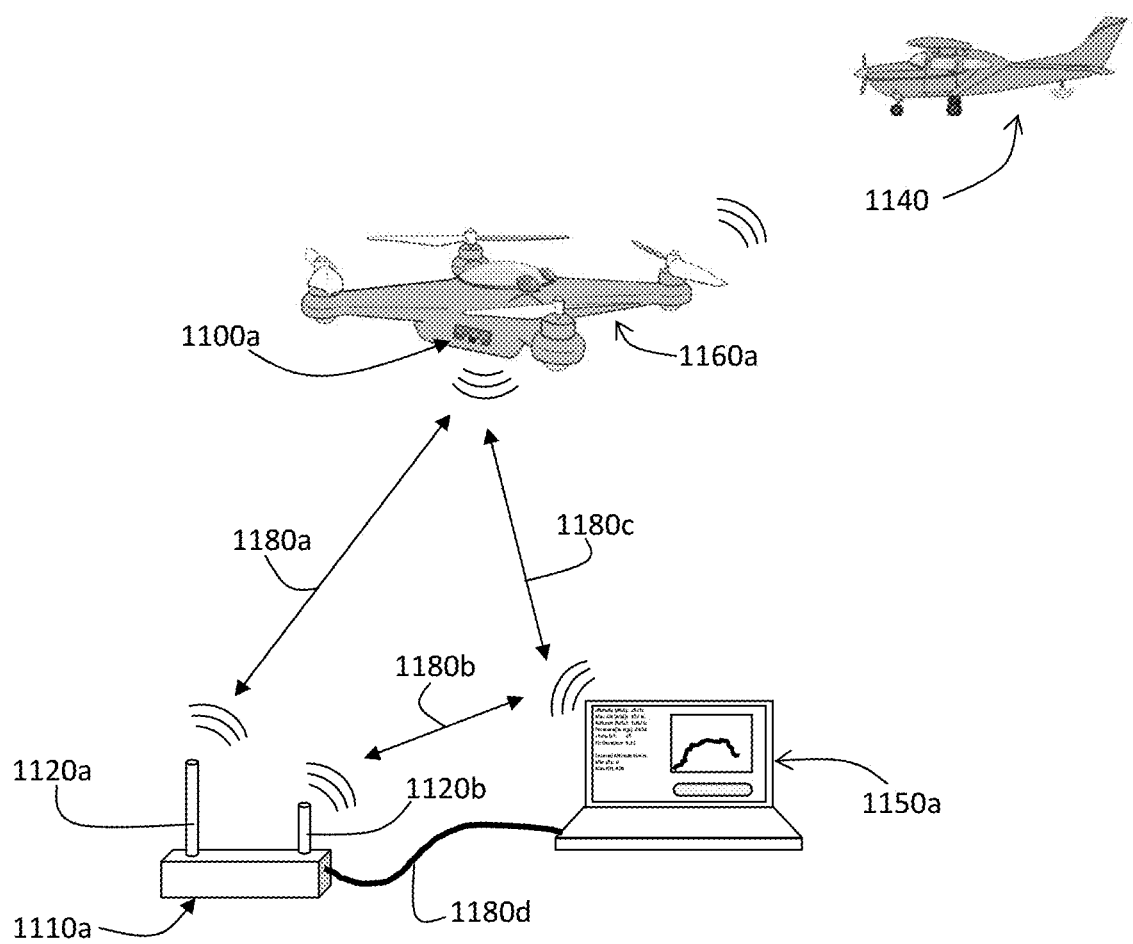
FIGS. 11a-11c illustrate various communication paths and use of a communication protocol conversion device with the AWSS.

FIG. 11a illustrates various communication paths and use of a communication protocol conversion device with the AWSS, in conjunction with a portable programming/display device 1150a. In a first illustrative embodiment, AWSS 1100a may be attached to airborne UAV/UAS 1160a wirelessly transmitting the pre-flight, altitude initialization, and other navigational data to and from receiving stations on the ground 1150a or in the air 1140.

As mentioned above, the AWSS 1100a may communicate the navigational and other data using a plurality of communication protocols. For example, in one illustrative embodiment, data is transmitted using both WiFi and V/UHF protocols. In another embodiment, the AWSS may utilize WiFi, V/UHF, and cellular protocols. In some situations, the intended receiver may not have the functionality to receive all utilized protocols. In that situation, a protocol or frequency conversion device 1100a might be useful.

In one illustrative example, a AWSS 1100a may utilize the V/UHF and WiFi protocols for data transmission. In this example, the ground receiving station 1150a may only be compatible with the WiFi protocol. In that situation, the receiving ground station 1150a may receive the WiFi signal directly 1180c from the AWSS 1100a but be unable to receive the V/UHF signal. A conversion device 1100a may be introduced to convert and relay the V/UHF data. Conversion device 1100a may include functionality to receive the V/UHF signal 1180a, using an antenna 1120a and internal receiver circuitry (not shown). The device 1100a may further comprise circuitry which decodes the received V/UHF signal and then converts the data into another format. In one example, the decoder/conversion circuitry may convert the received V/UHF data into a WiFi format. In another example, the decoder/conversion circuitry may convert the received V/UHF data into a serial signal format. In still another implementation, it may do both. In still other implementations various combinations of conversions may occur such as cellular to WiFi, cellular to serial etc. The point is that the conversion device 1110a allows a receiving station (ground or airborne) to receive and display data even when the receiving station is not equipped with communication protocol directly compatible with the AWSS. In one embodiment, the conversion device 1110a may be coupled to the receiving ground station 1150a by means of a hardware connection 1180d such as a cable or a USB connection.

Figure 11B:
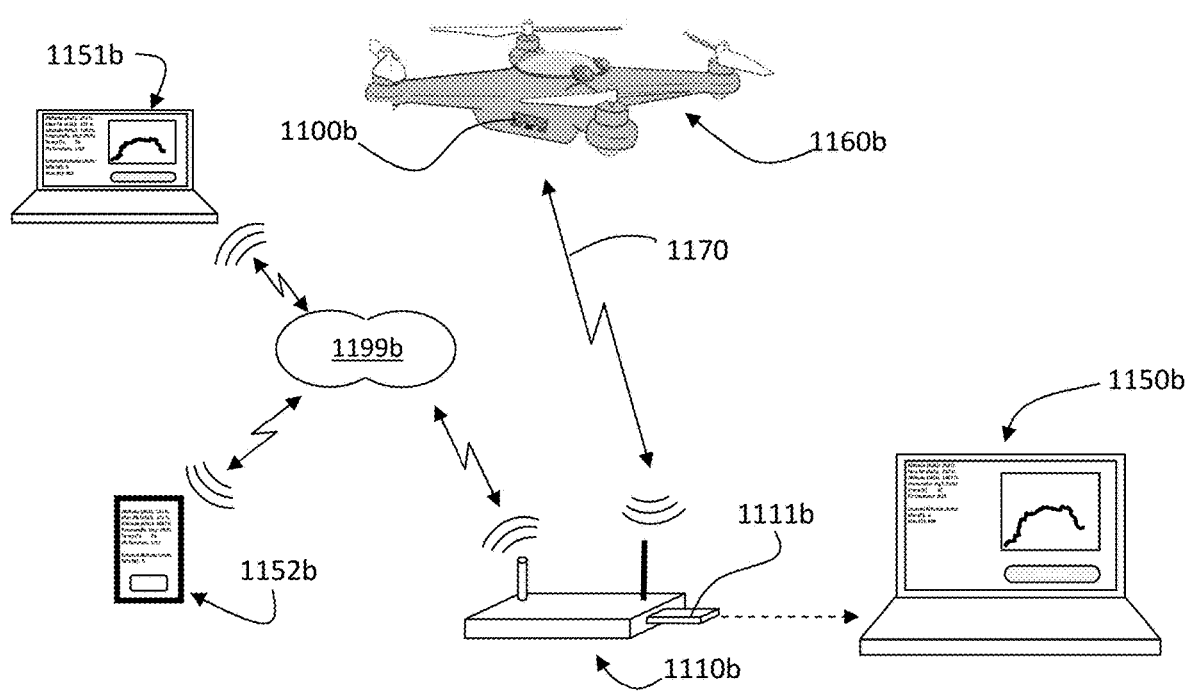

FIG. 11b illustrates another exemplary embodiment for and use of a communication protocol conversion device 1110b with a portable programming/display devices 1150b, 1151b, and 1152b. In the scenario of FIG. 11b, RRDD devices 1150b, 1151b, and 1152b are incompatible with the communication protocol used by AWSS 1100b and thus are unable to receive its broadcasts 1170 directly. In the embodiment of FIG. 11b, conversion device 1110b provides one or more communication protocol conversions. In a first example, a conversion device 1110b may be fitted with a connection system 1111b which may permit a direct physical connection between the conversion device 1110b and a RRDD/programming device 1150b. The connection may then allow the converted signal to pass directly to the RRDD/programming device via the connector 1111b. In one illustrative embodiment, the connector 1111b is a Universal Serial Bus (USB) connector. In another embodiment, the conversion device 1110b may set up a local wireless network 1199b using a communication protocol compatible with programming devices 1151b and 1152b. As just one example, the wireless network 1199b might comprise the WiFi protocol.

Figure 11C:
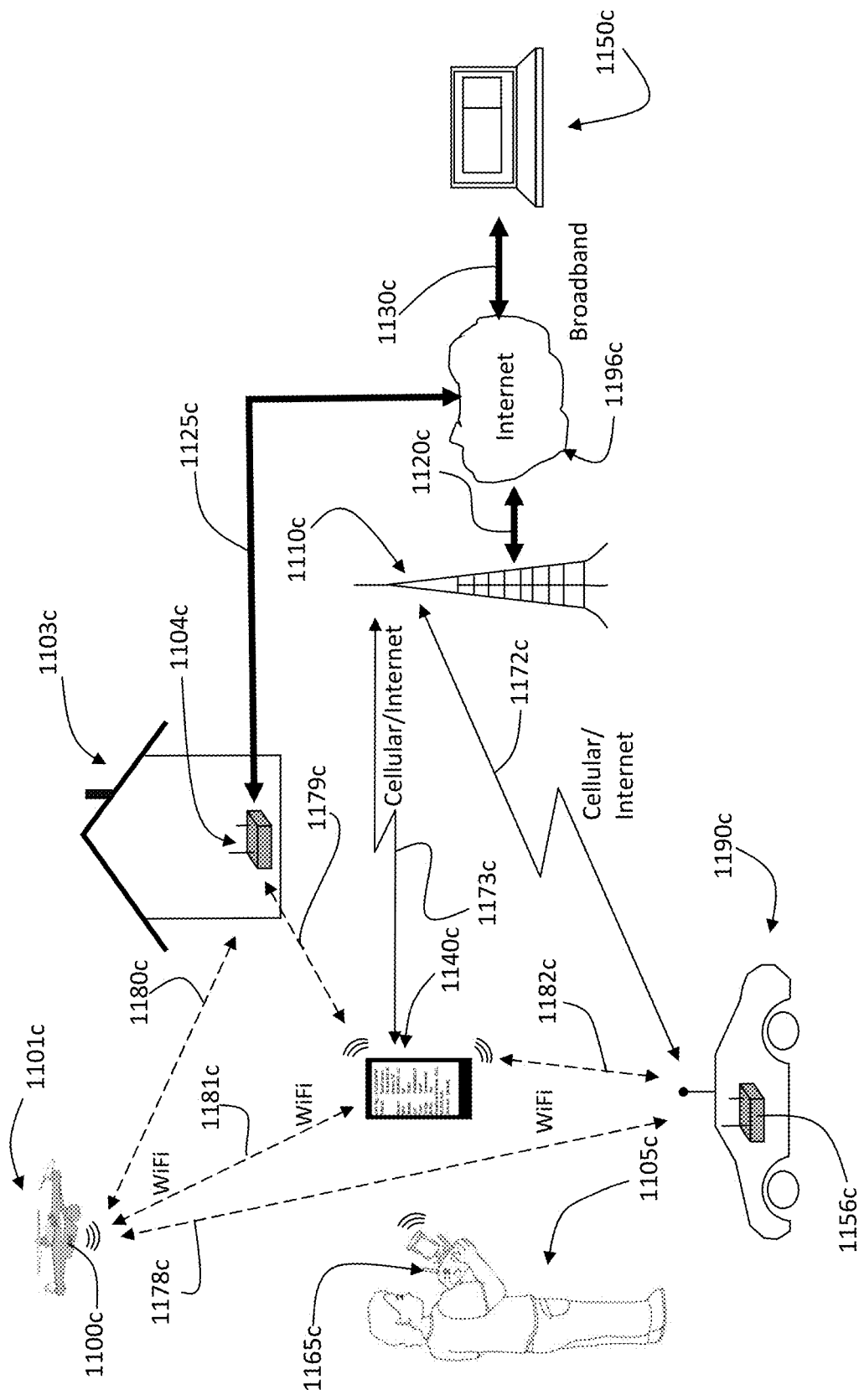

FIG. 11c illustrates several additional connection modes which could be used in the present invention. One mode illustrated utilizes a wireless router 1104c connected by broadband to the internet, as might be found in a residential or business structure. Recall that one common set of commercial operations is the survey of real property. For example, a photographic survey being conducted in conjunction with a real estate listing or perhaps a structural inspection. In those cases, the drone operator 1105c might be standing just outside or adjacent to the structure 1103c being photographed/inspected. In some cases, especially where the property is an inhabited structure such as a residence or office structure, often a wireless WiFi router 1104c, connected to internet 1196c through conventional broadband techniques 1125c, will be within radio range of the UAS/

AWSS 1101c/1100c and pilot 1105c conducting the survey. If the UAS/AWSS 1101c/1100c is within radio range of the wireless router 1104c, the AWSS 1100c (equipped with a WiFi communication module) may connect to the internet 1196c in the usual fashion along WiFi path 1180c, allowing a pilot to remotely program the AWSS 1100c through the internet from terminal 1150c.

In another embodiment, smart device 1140c may act as a mobile hotspot (e.g. smartphone mobile hotspot (SMHS)). The UAS/AWSS 1101c/1100c may connect to smart device 1140c along WiFi path 1181c, and then smart device 1140c may provide internet access using its cellular/internet connection 1173c. This process is sometimes referred to in the art as "tethering" or "phone-as-modem" (PAM). Alternatively, smart device 1140c may act as a relay by receiving data from the AWSS via WiFi path 1181c and then connecting to wireless router 1104c over WiFi path 1179c, which then connects to the internet 1196c using conventional broadband connection 1125c. In still a further embodiment, the smart device may act as a relay to mobile hotspot 1156c to connect to the internet. In that implementation, smart device 1140c may connect 1182 to mobile hotspot (cellular modem) 1156c, which then provides a connection to the internet 1196c using conventional cellular/internet techniques 1172c. Each of these paths allows the pilot or other operator to remotely program the AWSS 1100c through the internet.

In still another alternative implementation, the UAS/AWSS 1101c/1100c connects directly 1178c to the mobile hotspot 1156c which provides a connection to the internet 1196c using conventional cellular/internet techniques 1172c. The mobile hotspot (cellular modem) may be associated with a motor vehicle 1190c or, an independent unit hand carried into position. This latter embodiment allows the hotspot to be easily positioned in the most range advantageous spot. In any of these implementations, the smart device 1140c may connect to the AWSS 1100c via path 1181c to communicate pre-flight programming and initialization of the altitude monitoring system. Thus, if the control station/smart device 1150c were located some distance from a WiFi transceiver, the programming connection could be made through a cellular internet connection via the paths described above.

FIGS. 12a and 12b are side and top views, respectively, showing some distance measurements referred to in this specification. As mentioned earlier, in some operational modes, it may be a regulatory requirement to keep the UAS within visual line of sight (WVLOS) of the pilot/operator. Thus, an important flight consideration is the distance at which the UAS becomes invisible to the pilot. This is commonly referred to in the art as Beyond Visual Line of Sight (BVLOS). This distance is a function of many things, most prominently the size of the object. Since there is no way for the instrumentation to determine whether the UAS is within or beyond visual range, the distance from the pilot/control station to the UAS may be used as a proxy. As discussed above, during pre-flight programming, the pilot is given the opportunity to enter a BVLOS distance value (see FIG. 9c), which the system will use for any alerts (see FIG. 9k) or other functions which may queue off this distinction. FIG. 12a illustrates the AGL altitude 1220a, 1220b and instantaneous distances 1210a, 1210b between the UAS 1201a, 1201b, respectively, and the pilot/control station 1205/1265. The altitudes (1220a, 1220b) and lateral distances (1230a, 1230b) are quantities provided by or computed from AWSS sensor data. As described above, AGL altitudes 1220a, 1220b are computed based on barometric altimeter data and an initial zero_AGL_bias measurement. Lateral distances 1230a, 1230b are computed based on the current position (L/L) of the UAS and the position of the control station determined during initialization. It is an elementary computation, based on the Pythagorean Theorem, to then determine the line of sight distances 1210a, 1210b. (Note this assumes that the control station is not appreciably moved since the commencement of flight. This is a reasonable assumption as UAS control would normally be from a stationary position. If necessary, the internal GPS included in most smartphones could be used to update the control station position.)

FIG. 12b is a top down view of an illustrative UAS mission for purposes of illustrating the total mission distance (TMD) parameter which may be reported on the receiver/display unit as discussed above. In operation, starting at initial position $P_{i=0}$ is designated as $1250_{i=0}$, the AWSS processing system would periodically obtain the UAS positions $\{P_i, P_{i+1}, P_{i+2}, \ldots\}$ using the GPS sensor, corresponding in the figure to point $1250_{i=1}$, $1250_{i=2}$, $1250_{i=3}$ etc. and then determine the incremental distance traveled between updates $\{D_i=|P_i-P_{i+1}|; D_{i+1}=|P_{i+1}-P_{i+2}|; \ldots\}$. The position sampling rate would be sufficient to accurately approximate curved path legs such as $1255_{n=6}$, $1255_{n=7}$, and $1255_{n=9}$ in the figure. These incremental distances would then be summed to obtain the total mission distance (TMD).

$$TMD = \sum_{i=1}^{n} D_i$$

Figure 13:
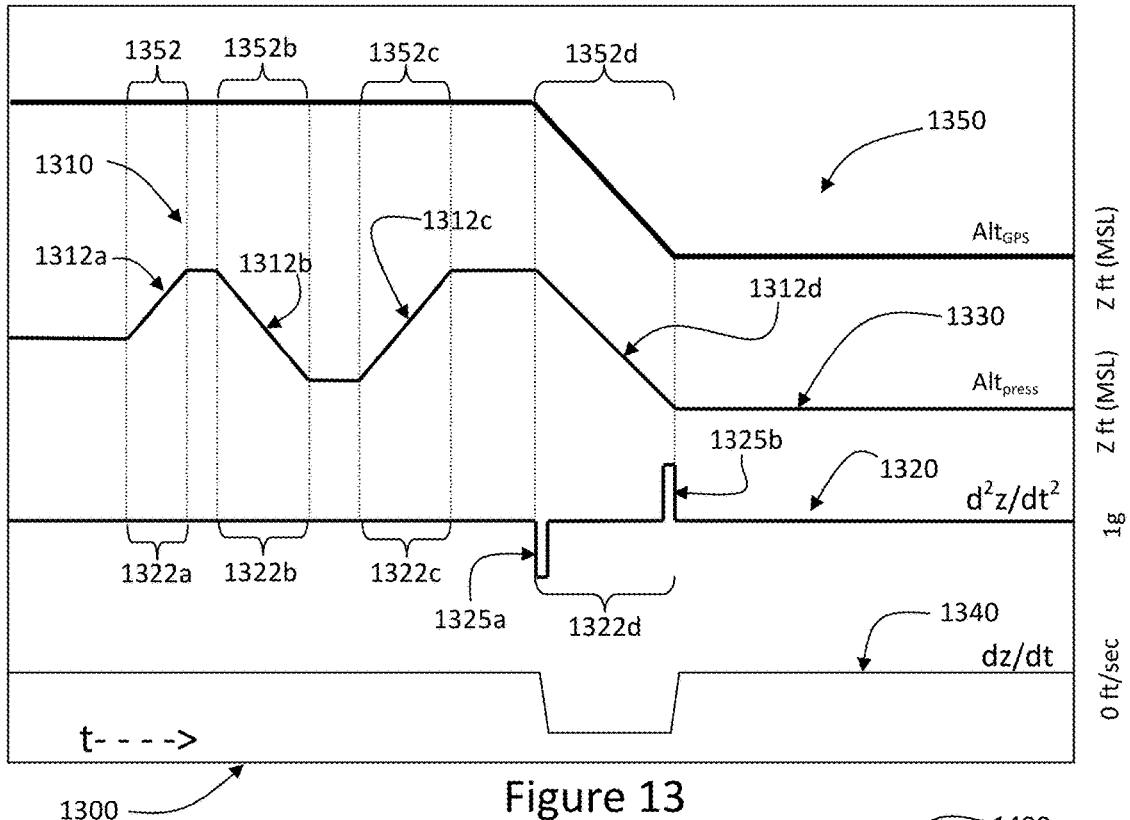
FIG. 13 illustrates time domain sensor response for the primary and secondary (monitor) sources to various altitude scenarios.

FIG. 13 illustrates some principles of the invention with a simplified graph of some sensed parameters. Shown is the pressure altitude output of the primary altitude source. As discussed above, in exemplary embodiments, the primary altitude source is a pressure altimeter such as the NXP MPL3115A2. This sensor outputs pressure based on sensed atmospheric pressure and may use local pressure setting or pressure altitude offsets to adjust for local conditions. As discussed above, changes in apparent altitude may be caused by changes in the UAS altitude or by meteorological changes in atmospheric pressure. These changes are generally quite small for small travel footprint and flight time associated with small UAS (sUAS) but may be more pronounced for larger UAS flying long distances and/or longer duration missions. The sensed pressure altitude ($Alt_{press}$) is represented with the profile line 1310. As seen in the illustration, several changes in altitude are shown 1312a, 1312b, 1312c, and 1312d.

Also seen in the figure is a time domain plot of the z-axis output of an accelerometer sensor 1320 and GPS altitude 1350. As mentioned above, in an exemplary embodiment, the secondary (monitor) sensor may be an accelerometer, a GPS receiver, or both. Accelerometers do not measure altitude, but they do detect changes in acceleration, in particular vertical acceleration, which would be associated with changes in physical altitude. Importantly, both accelerometer's and GPS's outputs are unaffected by changes in atmospheric pressure. Thus, apparent changes in altitude caused by meteorological conditions versus changes in physical altitude will not be confirmed by the accelerometer or GPS.

As seen in the figure, several changes in pressure altitude are not associated with any change in vertical acceleration 1312a, 1312b, 1312c. Examining the Z-axis acceleration plot 1320 at the times corresponding to the pressure altitude changes 1322*a*, 1322*b*, 1322*c* indicates that the acceleration remains at 1 g (i.e. level flight). The pressure altitude change at 1312*d* is accompanied by z-axis accelerations 1322*d*. Specifically, negative z-axis acceleration 1325*a*, corresponding to a descent of the UAS, is then followed by a positive acceleration 1325*b*, as the UAS pulls up to level-off at pressure altitude 1330. The change in pressure altitude 1312*d* is thus confirmed by the accelerations 1325*a* and 1325*b*. Similarly, no GPS altitude change is noted for the times corresponding to the pressure altitude changes 1352*a*, 1352*b*, 1352*c*. However, the change indicated at 1352*d* corresponds to a change in GPS altitude. It should be noted that the illustrations of altitude and accelerations shown in the figure as straight lines in real life can be quite noisy and may require considerable pilot interpretation to judge its significance.

Figure 14:
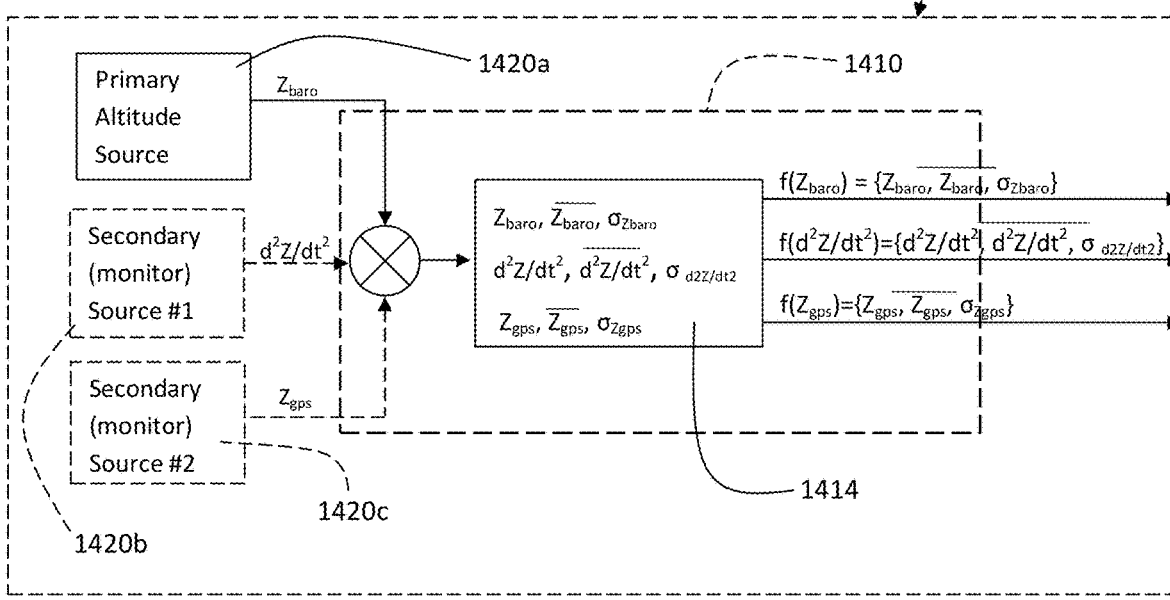
FIG. 14 is a pictorial representation relating system hardware to the altitude monitor function.

FIG. 14 is a pictorial illustration of the interaction between system hardware (sensor, processor) and the altitude monitor function. Primary altitude sensor 1420*a* provides its input to processor 1410. As mentioned, in an exemplary embodiment, the primary altitude sensor 1420*a* may be a pressure altimeter outputting pressure altitude. Secondary (monitor) source 1420*b* also provides its input to the processor 1410. In an exemplary embodiment, the secondary (monitor) source 1420*b* may be an accelerometer outputting z-axis accelerations. In yet another embodiment, a second secondary (monitor) source 1420*c* may be employed. In some embodiments, this is an independent source of altitude measurement such as a GPS, LIDAR, or the like.

Sensors 1420*a*, 1420*b*, and 1420*c* output their data and are 'read' by the processor 1410, as discussed above in connection with the overall system architecture. The processor executing the altitude monitoring function 1414 uses the sensor data to determine certain statistical measures, such as mean and standard deviation, which may then be communicated to the remote receiver/display system (not shown) for display to the pilot. The pilot may then use the data to make qualitative or quantitative assessments of the UAS altitude reporting accuracy and the need for a re-initialization of the altitude system.

Figure 15:
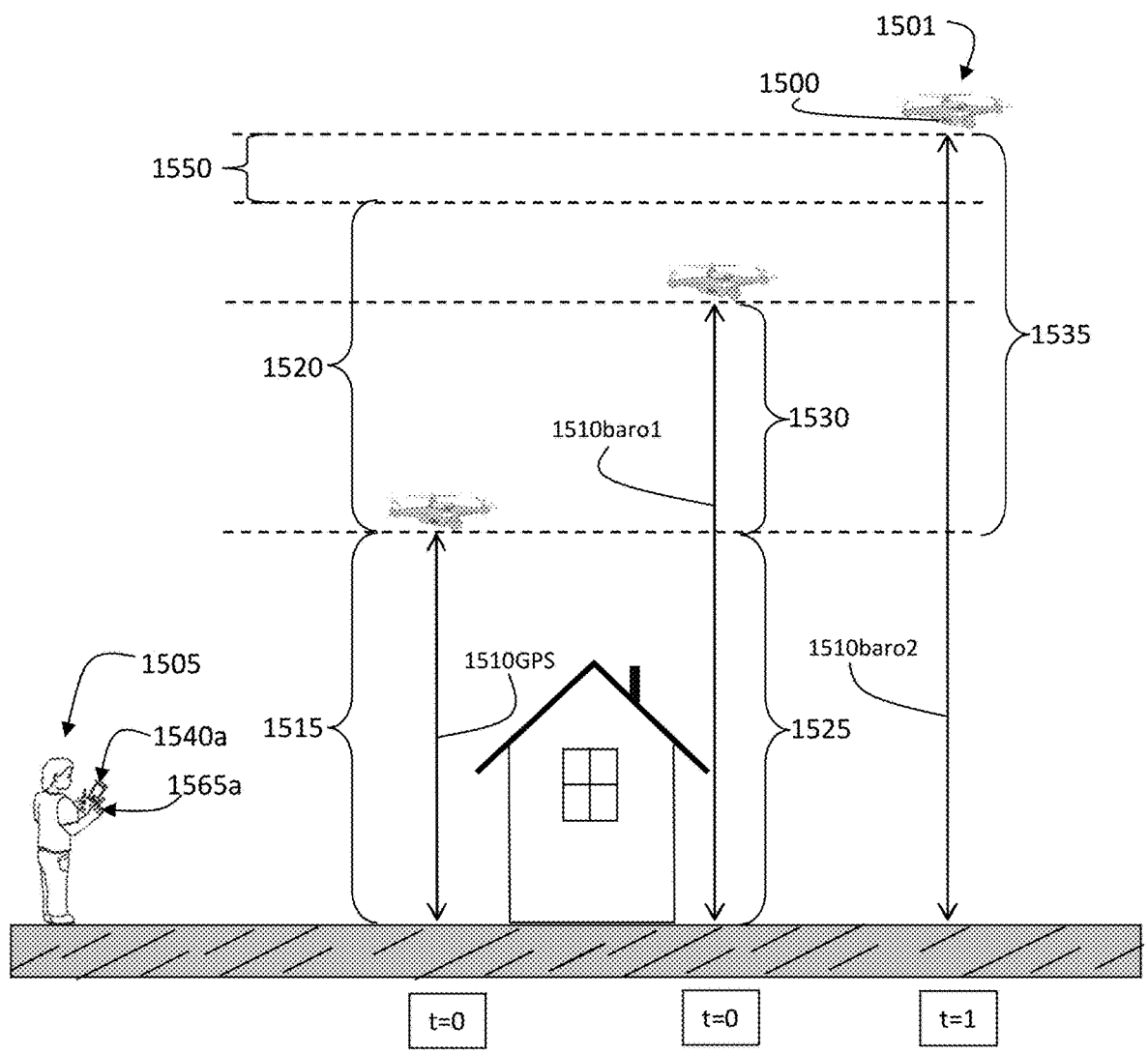
FIG. 15 illustrates how the primary and secondary sensor altitudes might be related and some of the monitored values.

FIG. 15 illustrates various altitudes discussed in this specification as it relates to the altitude monitoring and alerting functions. As discussed in connection with earlier figures, the AWSS 1500 secured to the UAS 1501 in-flight may comprise both a barometric altimeter and a secondary (monitor) source. For purposes of illustration, the figure assumes the monitor is a GPS measuring geometric altitude. Two time references ($t_0$ and $t_1$) are shown in the figure to illustrate the monitoring and alerting function. For illustration purposes, it will be assumed that scenario 0 precedes scenario 1 in time. It will also be assumed that the actual altitude of the UAS is unchanged between the two scenarios. In scenario 0 ($t_0$), the barometric altitude is given as 1510baro1 and the GPS altitude is shown as 1510GPS. As seen in the figure, the barometric altitude is greater than the scenario 0 ($t_0$) GPS altitude. This difference (GPS/BARO Δ) is represented with bracket 1530. For purposes of illustration, the allowed variance window is represented by bracket 1520 (MAX_Δ). Recall that a MAX_Δ value may be an initialization parameter which may be entered (958 FIG. 9*l*). As seen by visual inspection of FIG. 15, the altitude difference (GPS/BARO Δ) 1530 is less than the tolerance window (MAX_Δ) 1520. Therefore, in accordance with the teachings of the invention, no alert would be generated. The difference in attitudes may be displayed on the flight data pages for pilot situational awareness. (see 937 FIG. 9*h*)

In scenario 1 ($t_1$), the barometric altitude 1510baro2 has increased, and the GPS altitude has remained constant at 1510GPS. Thus, the delta between the two (GPS/BARO Δ) is now indicated by bracket 1535. As can be seen in the figure, the difference now exceeds the tolerance window (MAX_Δ) 1520 (i.e. 1535>1520). In accordance with the teachings of the invention, an alert (see 985*j*, FIG. 9*j*) may be raised to the pilot indicating this situation. This figure illustrates the situation where difference between the barometric and geometric altitudes may grow with the actual altitude of the UAS remaining constant. A common reason for such a growth is a change in the local pressure due to weather phenomenon. For example, an approaching low pressure system may cause the local pressure, resulting in an apparent increase in UAS pressure altitude. Similarly, an approaching high pressure system may cause an increase in local pressure and a resulting decrease in apparent UAS pressure altitude. It should be noted that the figure simplifies the real world situation where the altitude values from both the primary and secondary (monitor) sources are constantly changing, even with the actual UAS altitude remaining constant. Thus as was suggested above, it may be helpful to use median or moving average value instead of instantaneous values to make judgments.

While a UAV/UAS altitude initialization and monitor system and method has been described with reference to various exemplary embodiments and component choices, it will be understood by those skilled in the art that various changes may be made as noted throughout the specification, including substitution of various sensor components, methods for executing processor instructions and the like, including changes in function and arrangement of components or process steps without departing from the scope of the teachings herein. In addition, many modifications may be made to adapt the teachings herein to a particular situation without departing from the scope thereof. Therefore it is intended that the claims not be limited to the particular embodiments disclosed.

What is claimed is:

1. A method of monitoring and initializing unmanned aircraft system (UAS) altitude for use with a Airborne Wireless Sensing System (AWSS), the AWSS associated with a UAS and operative to communicate Remote Identification (RID) data (RIDD) to a remote receiver/display device (RRDD), the AWSS having one or more sensor modules for sensing UAS flight data, the one or more sensor modules comprising at least a primary pressure altitude sensor module operative to measure UAS pressure altitude, a non-volatile memory (NVM) for storing altitude initialization data and computer instructions, and a processor for executing the computer instructions and interfacing with the one or more sensor modules, the computer instructions including instructions to execute an altitude initialization and monitor function (AIMF), the RRDD having an input and display configured to receive inputs and display data on one or more graphical user interface (GUI) display pages, the AWSS and RRDD having communication modules for establishing a communication link there between, the method comprising:

initializing the AWSS prior to flight while the UAS is on or near the ground, the initialization including at least the step of reading altitude initialization parameters and storing the initialization parameters into AWSS NVM;

launching the UAS to create an in-flight state;

sensing raw UAS pressure altitude while the UAS is in-flight by periodically sampling the primary pressure altitude sensor;

determining the UAS corrected pressure altitude based on the sensed raw pressure altitude and the stored altitude initialization parameters using the AWSS processor;

transmitting the UAS corrected pressure altitude;

receiving and displaying on the remote receiver/display device (RRDD), the transmitted UAS corrected pressure altitude;

monitoring UAS corrected pressure altitude and determining the need for a re-initialization; and executing a re-initialization of the AWSS responsive to a reset request from the RRDD, the re-initialization including at least the steps of re-reading the altitude initialization parameters.

2. The method of claim 1 wherein the RRDD further includes an input configured to receive operator entries and selections and wherein the step of initializing the AWSS further includes:

displaying one or more altitude initialization data pages on the RRDD display, the initialization data pages comprising a program button and one or more altitude initialization data display and entry fields for receiving altitude initialization entries, the entry fields including at least one of take-off field elevation (TOE), altimeter setting (QNH), or, altitude offset (OFF_H);

entering altitude initialization data in the initialization data entry fields using the RRDD input, the entry including at least one of take-off field elevation (TOE), altimeter setting (QNH), or altitude offset (OFF_H), commanding the altitude initialization function by selecting the program command button on the altitude initialization data page causing the entered altitude initialization data to be transferred to the AWSS, and storing the received altitude initialization data in the AWSS NVM.

3. The method of claim 1 wherein the RRDD further includes a user input configured to receive operator selections and wherein the RRDD display pages include one or more altitude initialization pages, and wherein the step of performing a re-initialization with a reset includes:

displaying a reset command button on the one or more RRDD display pages, transmitting a reset command to the AWSS based on operator selection of the reset command button on the one or more RRDD pages, the reset command including at least a transmission of the altitude initialization parameters;

determining whether the UAS is in a 'ground' or 'air' state and, if on ground:
processing the received reset command with the AWSS processor to execute the re-initialization including at least re-reading the altitude initialization parameters from the RRDD and storing the initialization parameters into AWSS NVM, or if in air,
generating an alert indication that re-initialization is prohibited.

4. The method of claim 1 wherein the AWSS further includes a secondary (monitor) sensor and wherein the step of monitoring the UAS corrected pressure altitude and determining the need for an re-initialization includes transmitting the secondary (monitor) sensor data to the RRDD for display to the UAS pilot.

5. The method of claim 4 wherein the secondary (monitor) system comprises at least one of a Global Positioning System (GPS) operative to measure altitude and an accelerometer operative to measure vertical acceleration and wherein the step of monitoring the UAS pressure altitude with the secondary (monitor) sensor includes verifying that changes in pressure altitude have a corresponding change in GPS altitude or vertical acceleration.

6. The method of claim 3 wherein execution of the reset command by the AWSS processor causes execution of the re-initialization, the re-initialization further including:

resetting maximum altitude (MAX_ALT (AGL)); minimum altitude (MIN_ALT (AGL));

total distance traveled (TDT); flight duration (FLT_DUR), maximum mission altitude (MAX_MA); control station/UAS distance (CS/UAS_DIST), and initializing the zero_agl_bias by,
taking an initial reading of raw UAS pressure altitude while the UAS is on the ground, defined as the zero_agl_bias and storing the zero_agl_bias into AWSS NVM, determining the UAS agl_altitude based on the raw sensed pressure altitude and the stored zero_agl_bias using the AWSS processor.

7. The method of claim 2 wherein the initialization step further includes:

receiving the altitude initialization parameters in the AWSS transmitted from the RRDD, storing the received altitude initialization in the AWSS altitude monitor module, determining an on-ground raw pressure altitude by taking a reading of the raw pressure altitude with the primary pressure altitude sensor while the UAS is on the ground, determining a correction factor based on the sensed on-ground raw pressure altitude and the stored altitude initialization parameters, and determining a corrected UAS pressure altitude based on the raw sensed UAS pressure altitude and the correction factor.

8. The method of claim 2 wherein the initialization step further includes:

displaying one or more altitude initialization data pages on the RRDD display, the initialization data pages comprising an entry field for receiving an altitude a monitor alert parameter, the monitor alert parameter defining a condition the satisfaction of which generates a monitor alert, entering a monitor alert parameter in the initialization data entry field, communicating the monitor alert parameter to the AWSS upon selection of the program command button on the altitude initialization data page, and wherein the AWSS further includes a secondary (monitor) sensor, and wherein the step of monitoring the UAS corrected pressure altitude and determining the need for an re-initialization further includes:

comparing the output of the secondary (monitor) sensor and the UAS corrected pressure altitude, determining if the alerting condition of the monitor alert parameter is satisfied and if so, transmitting the monitor alert to the RRDD.

9. An altitude initialization and monitoring system (AIMS) for initializing and monitoring and the altitude output of an Airborne Wireless Sensor System (AWSS), the AWSS associated with an unmanned aircraft system (UAS) and operative to communicate altitude and other Remote Identification (RID) data (RIDD) to end users, the RIDD being displayed on a remote receiver/display device (RRDD), the system comprising:

an AWSS associated with a UAS, the AWSS having,
  one or more sensor modules configured for sensing UAS navigational flight data, the sensor modules including at least a primary pressure altitude sensor,
  one or more communication modules for communicating data between the RRDD and the AWSS,
  a non-volatile memory (NVM) for storing first computer software instructions and altitude initialization data,
  a processor module, configured to interface with the one or more sensor modules, the NVM, and the one or more communication modules, the processor module further configured to execute the first computer software instructions stored in the non-volatile memory, the execution of which:
    initializes the AWSS prior to flight while the UAS is on or near the ground, the initialization including at least the step of reading the altitude initialization parameters and determining a pressure altitude correction factor;
    stores the initialization parameters and correction factor into AWSS NVM;
    senses, raw UAS pressure altitude while the UAS is in-flight by periodically sampling the primary pressure altitude sensor;
    processes the sensed raw UAS pressure altitude with the processor, the processing comprising at least the step of determining a corrected UAS pressure altitude by applying the correction factor to the raw sensed pressure altitude;
    transmits to the RRDD, the corrected UAS pressure altitude,
    receives from the RRDD a reset command, and
    executes a re-initialization of the UAS altitude based on the received reset command, the re-initialization comprising at least re-reading the altitude initialization parameters and re-determining a pressure altitude correction factor.

10. The system of claim 9 wherein the RRDD further includes a communication module for communicating with the AWSS, a display configured to display one or more graphical user interface (GUI) pages, the pages displaying altitude initialization programming parameters, an input configured to receive operator input, a non-volatile memory for storing a second computer instruction code, and a processor for executing the second computer instruction code, the execution of which:
  displays one or more altitude initialization data pages on the RRDD display, the altitude initialization data pages comprising a program button and one or more altitude initialization data display and entry fields for receiving altitude initialization entries, the entry fields including at least one of take-off field elevation (TOE), altimeter setting (QNH), or altitude offset (OFF_H),
  receives altitude initialization data entered in the initialization data entry fields using the RRDD input, the entry including at least one of take-off field elevation (TOE), altimeter setting (QNH), or altitude offset (OFF_H), and
  commands the AWSS altitude initialization programming function upon selection of the program command button on the RRDD input causing the entered altitude initialization data to be communicated to the AWSS and initiating the altitude initialization process.

11. The system of claim 9 wherein the AWSS further includes a weight-on-wheels (WOW) module operative to determine whether the UAS is on the ground or in the air and wherein the first computer instruction code when executed by the AWSS processor:
  receives the reset command and altitude initialization parameters communicated from the RRDD;
  receives input from the WOW module determining whether the UAS is on the ground or in the air, and
  if on the ground,
    processes with the AWSS processor the reset command including at least re-reading of altitude initialization parameters from the RRDD, determining a pressure altitude correction factor, and storing the initialization parameters and correction factor into AWSS NVM, or
  if in air,
    generating an alert indication that initialization is prohibited, and
    communicating the alert indication to the RRDD for display.

12. The system of claim 9 wherein the AWSS further includes a secondary (monitor) source used to monitor UAS corrected pressure altitude by validating changes in UAS corrected pressure altitude with corresponding changes in the secondary (monitor) source.

13. The system of claim 12 wherein the secondary (monitor) source is selected from one or more of a Global Positioning System (GPS) measuring UAS GPS altitude or an accelerometer measuring UAS acceleration in the z-axis (vertical) and wherein the execution of the first computer instruction code causes the GPS altitude and/or the z-axis acceleration value to be transmitted to the RRDD for display, the GPS altitude and/or z-axis acceleration value used to monitor UAS corrected pressure altitude by validating change in UAS corrected pressure altitude with corresponding changes in GPS altitude and/or z-axis acceleration.

14. The system of claim 10 wherein the step of receiving initialization data entered on the RRDD initialization pages includes:
  entry of a monitor alert value, and
  wherein the step of receiving a reset from the RRDD includes:
    comparing the secondary (monitor) source to the monitor alert limit, and
  wherein the step of re-initialization includes:
    resetting maximum altitude (MAX_ALT (AGL)); minimum altitude (MIN_ALT (AGL)); total distance traveled (TDT); flight duration (FLT_DUR), maximum mission altitude (MAX_MA); control station/UAS distance (CS/UAS_DIST).

15. A First and second processor modules comprising computer instruction code executable on the processor modules, implementing an altitude initialization and monitoring system (AIMS) of an airborne Wireless Sensor System (AWSS), the AWSS associated with the UAS and operative to communicate flight data (FD) to end users, the FD being displayed on a remote receiver/display device (RRDD), the computer instruction code implemented system comprising:
  an AWSS, the AWSS having a plurality of sensor modules including at least a primary pressure altitude sensor, one or more communication modules for communicating with the RRDD, a non-volatile memory (NVM) for storing a first computer software instruction code and altitude initialization parameters, the first processor module, configured to interface with the plurality of sensor modules, and the one or more communication modules, the processor module further configured to execute the first computer software instructions stored in the non-volatile memory, an RRDD having a non-volatile memory (NVM) for storing a second computer instruction code set, the second processor module executing the second computer instruction code set, an input configured to receive operator input, a display configured to display one or more graphical user interface (GUI) pages, the pages displaying and receiving at least altitude initialization parameter inputs, and one or more communication modules for communicating with the AWSS, the first computer instruction code set when executed by the AWSS first processor module implementing the steps of, initializing the AWSS including at least the step of reading the altitude initialization parameters and storing the altitude initialization parameters into AWSS NVM;

sensing raw UAS pressure altitude by periodically sampling the primary pressure altitude sensor;

determining the UAS corrected pressure altitude based on the raw sensed pressure altitude and the stored initialization parameters using the AWSS first processor module;

transmitting the UAS corrected pressure altitude to the RRDD;

receiving a reset command and re-initialization parameters transmitted from the RIDD;

receiving input from the WOW module determining whether the UAS is on the ground or in the air, and if on the ground, processing with the AWSS first processor module the reset command including at least re-reading the altitude initialization parameters and storing the initialization parameters into AWSS NVM, or if in air, generating an alert indication that re-initialization is prohibited, and transmitting the alert indication to the RRDD for display.

16. The processor module computer instruction code implemented system of claim 15 wherein the second computer instruction code set when executed by the RRDD second processor module implementing the steps of:

displaying one or more altitude initialization data pages on the RRDD display, the initialization data pages comprising program and reset command buttons and one or more altitude initialization data display and entry fields for receiving altitude initialization entries, the entry fields including at least one of take-off field elevation (TOE), altimeter setting (QNH), or altitude offset (OFF_H), receiving altitude initialization data entered in the altitude initialization data entry fields using the RRDD input, the entry including at least one of take-off field elevation (TOE), altimeter setting (QNH), or altitude offset (OFF_H), and commanding the initialization programming function upon selection of the program command button on the RRDD input causing the entered altitude initialization data to be transferred to the AWSS, receiving and displaying on the remote receiver/display system, the transmitted UAS corrected pressure altitude, monitoring UAS primary sensor pressure altitude and determining the need for a reset, transmitting a reset command and re-initialization parameters to the AWSS based on selection of the reset command button on the RRDD.

17. The processor module computer instruction code implemented system of claim 16 wherein the first computer instruction code set when executed by the AWSS first processor module initializing the AWSS further implementing the steps of determining a pressure altitude correction factor from the initialization parameters and an initial reading of raw UAS pressure altitude while the UAS is on the ground and wherein the UAS corrected pressure altitude is determined based on application of the pressure altitude correction factor to the raw sensed pressure altitude and further wherein the AWSS comprises a secondary (monitor) sources and wherein the step of monitoring the UAS primary sensor pressure altitude to determine the need for a reset, includes the step of validating changes in UAS corrected pressure altitude with corresponding changes in the secondary (monitor) source.

18. The processor module computer instruction code implemented system of claim 15 wherein the first computer instruction code set executed step of initializing the AWSS further includes:

taking an initial reading of raw UAS pressure altitude while the UAS is on the ground, defined as the zero_agl_bias;

storing the zero_agl_bias into AWSS NVM;

processing the raw sensed UAS pressure altitude with the AWSS first processor module, the processing further comprising the steps of determining the UAS agl_altitude based on the raw sensed pressure altitude and the stored zero_agl_bias determined during initialization;

transmitting the agl_altitude, to the RRDD, and wherein the second computer instruction code set executed steps further includes, receiving the transmitted agl_altitude on the RRDD, and displaying the agl_altitude on the RRDD display.

19. The processor module computer instruction code implemented system of claim 17 wherein the second computer instruction code set when executed by the RRDD second processor module further implementing the steps of:

displaying one or more altitude initialization data pages on the RRDD display, the initialization data pages comprising an entry field for receiving altitude a monitor alert parameter, the monitor alert parameter defining a condition the satisfaction of which generates a monitor alert, entering a monitor alert parameter in the initialization data entry field, communicating the monitor alert parameter to the AWSS upon selection of the program command button on the altitude initialization data page, and wherein the first computer instruction code set when executed by the AWSS first processor module further implementing the steps of:

comparing the output of the secondary (monitor) sensor and the UAS corrected pressure altitude, determining if the alerting condition of the monitor alert parameter is satisfied and if so, transmitting the monitor alert to the RRDD.

20. The processor module computer instruction code implemented system of claim 15 further comprising the step of receiving a command of re-initialization from the receiver/display, the re-initialization including resetting maximum altitude (MAX_ALT (AGL)); minimum altitude (MIN_ALT (AGL)); total distance traveled (TDT); flight duration (FLT_DUR), maximum mission altitude (MAX_MA); control station/UAS distance (CS/ UAS_DIST), and zero_AGL_bias.

\* \* \* \* \*